US011958291B2

United States Patent

Mizuta et al.

(10) Patent No.: US 11,958,291 B2

(45) Date of Patent: Apr. 16, 2024

(54) LIQUID DISCHARGING HEAD AND LIQUID DISCHARGING APPARATUS

(71) Applicant: Seiko Epson Corporation, Tokyo (JP)

(72) Inventors: Shohei Mizuta, Matsumoto (JP); Hiroaki Okui, Azumino (JP)

(73) Assignee: SEIKO EPSON CORPORATION (JP)

( * ) Notice: Subject to any disclaimer, the term of this patent is extended or adjusted under 35 U.S.C. 154(b) by 110 days.

(21) Appl. No.: 17/826,212

(22) Filed: May 27, 2022

(65) Prior Publication Data

US 2022/0379614 A1 Dec. 1, 2022

(30) Foreign Application Priority Data

May 28, 2021 (JP) ................................ 2021-089896

(51) Int. Cl.
*B41J 2/14* (2006.01)

(52) U.S. Cl.
CPC ....... *B41J 2/14233* (2013.01); *B41J 2/14201* (2013.01); *B41J 2002/14241* (2013.01); *B41J 2002/14306* (2013.01); *B41J 2002/14491* (2013.01); *B41J 2202/11* (2013.01)

(58) Field of Classification Search
CPC ................ B41J 2/14233; B41J 2/14201; B41J 2002/14241; B41J 2002/14306; B41J 2002/14491; B41J 2202/11
See application file for complete search history.

(56) References Cited

U.S. PATENT DOCUMENTS 9,884,483 B2 * 2/2018 Ito ............................ B41J 2/045
2011/0018943 A1 1/2011 Owaki

FOREIGN PATENT DOCUMENTS

JP 2011-025493 A 2/2011

* cited by examiner

*Primary Examiner* — Geoffrey S Mruk

(74) *Attorney, Agent, or Firm* — Harness, Dickey & Pierce, P.L.C.

(57) ABSTRACT an adhesive having a first amount exists on a side of the first piezoelectric element line, of a joint of the wiring substrate and the pressure chamber substrate or the vibration plate, an adhesive having a second amount that is larger than the first amount exists on a side of the second piezoelectric element line of the wiring substrate, of the joint, and a first discharging element related to the first piezoelectric element line is different from a second discharging element related to the second piezoelectric element line.

12 Claims, 26 Drawing Sheets

LIQUID DISCHARGING HEAD AND LIQUID DISCHARGING APPARATUS

The present application is based on, and claims priority from JP Application Serial Number 2021-089896, filed May 28, 2021, the disclosure of which is hereby incorporated by reference herein in its entirety.

BACKGROUND

1. Technical Field

The present disclosure relates to a liquid discharging head and a liquid discharging apparatus.

2. Related Art

There is a liquid discharging head that discharges a liquid such as ink. The liquid discharging head includes a plurality of nozzles that discharges a liquid, a plurality of pressure chambers each of which communicates with each of the plurality of nozzles, a plurality of piezoelectric elements that is disposed on the pressure chambers and causes pressure fluctuation in the liquid inside the pressure chambers, and a wiring substrate that supplies a voltage to the plurality of piezoelectric elements. The plurality of nozzles is arranged in a predetermined direction to form a nozzle line. Similarly, the plurality of piezoelectric elements is arranged in the extending direction of the nozzle line to form a piezoelectric element line.

The liquid discharging head described in JP-A-2011-25493 has a plurality of nozzle lines. The liquid discharging head is provided with a plurality of piezoelectric element lines corresponding to the plurality of nozzle lines and is provided with a plurality of wiring substrates corresponding to the plurality of piezoelectric element lines. One wiring substrate is provided for one piezoelectric element line. A terminal of the wiring substrate is coupled to a lead electrode that is coupled to each piezoelectric element. The terminal of the wiring substrate is covered with, for example, a potting agent.

In the liquid discharging head described in JP-A-2011-25493, one wiring substrate is provided for one piezoelectric element line, and a potting agent is provided for each wiring substrate. On the other hand, in the case of a configuration in which one wiring substrate is provided between a plurality of piezoelectric element lines, variation may be generated in the liquid discharging characteristics for each of the plurality of piezoelectric elements.

SUMMARY

According to an aspect of the present disclosure, a liquid discharging head includes a pressure chamber substrate on which a plurality of first pressure chambers and a plurality of second pressure chambers are formed, a first piezoelectric element line in which a plurality of piezoelectric elements is arranged, each of the plurality of piezoelectric elements being provided for each of the plurality of first pressure chambers, a second piezoelectric element line in which a plurality of piezoelectric elements is arranged, each of the plurality of piezoelectric elements being provided for each of the plurality of second pressure chambers, a wiring substrate that is disposed between the first piezoelectric element line and the second piezoelectric element line and supplies a voltage to the plurality of piezoelectric elements in the first piezoelectric element line and the plurality of piezoelectric elements in the second piezoelectric element line, and a vibration plate that is disposed, in a thickness direction of the pressure chamber substrate, between the pressure chamber substrate and the plurality of piezoelectric elements, and an adhesive having a first amount exists on a side of the first piezoelectric element line, of a joint of the wiring substrate and the pressure chamber substrate or the vibration plate, an adhesive having a second amount that is larger than the first amount exists on a side of the second piezoelectric element line of the wiring substrate, of the joint, and a first discharging element related to the first piezoelectric element line is different from a second discharging element related to the second piezoelectric element line.

According to an aspect of the present disclosure, a liquid discharging head includes a pressure chamber substrate on which a plurality of first pressure chambers and a plurality of second pressure chambers are formed, a first piezoelectric element line in which a plurality of piezoelectric elements is arranged, each of the plurality of piezoelectric elements being provided for each of the plurality of first pressure chambers, a second piezoelectric element line in which a plurality of piezoelectric elements is arranged, each of the plurality of piezoelectric elements being provided for each of the plurality of second pressure chambers, a wiring substrate that is disposed between the first piezoelectric element line and the second piezoelectric element line and supplies a voltage to the plurality of piezoelectric elements in the first piezoelectric element line and the plurality of piezoelectric elements in the second piezoelectric element line, and a vibration plate that is disposed, in a thickness direction of the pressure chamber substrate, between the pressure chamber substrate and the plurality of piezoelectric elements, and the wiring substrate includes a main body portion that extends in the thickness direction of the pressure chamber substrate, and a terminal that is bent toward a side of the second piezoelectric element line from an end portion of the main body portion on a side of the pressure chamber substrate, an adhesive having a first amount exists on a side of the first piezoelectric element line, of a joint of the wiring substrate and the pressure chamber substrate or the vibration plate, and an adhesive having a second amount exists on a side of the second piezoelectric element line of the wiring substrate, of the joint.

According to an aspect of the present disclosure, a liquid discharging apparatus includes the above-described liquid discharging head and a control unit that controls discharge of a liquid by the liquid discharging head.

DESCRIPTION OF EXEMPLARY EMBODIMENTS

Hereinafter, embodiments for carrying out the present disclosure will be described with reference to the drawings. However, in each figure, the dimension and scale of each portion are appropriately changed from the actual ones. In addition, since the embodiments described below are preferred specific examples of the present disclosure, the embodiments are given technically preferable various limitations. However, the scope of the present disclosure is not limited to the embodiments unless otherwise specified in the following description.

In the following description, three directions that intersect with each other may be described as an X-axis direction, a Y-axis direction, and a Z-axis direction. The X-axis direction includes an X1 direction and an X2 direction that are opposite to each other. The Y-axis direction includes a Y1 direction and a Y2 direction that are opposite to each other. The Z-axis direction includes a Z1 direction and a Z2 direction that are opposite to each other. The Z1 direction is a downward direction and the Z2 direction is an upward direction. In addition, in the specification, the terms up and down are used. Up and down correspond to up and down in a normal use condition in which a nozzle of a liquid discharging apparatus 1 is located on a lower side.

The X-axis direction, the Y-axis direction, and the Z-axis direction are orthogonal to each other. The Z-axis direction is usually a direction extending in the vertical direction, but the Z-axis direction does not have to be a direction extending in the vertical direction. The Y-axis direction is one example of a first direction. The X-axis direction is one example of a second direction. The Z-axis direction is one example of a third direction.

Figure 1:
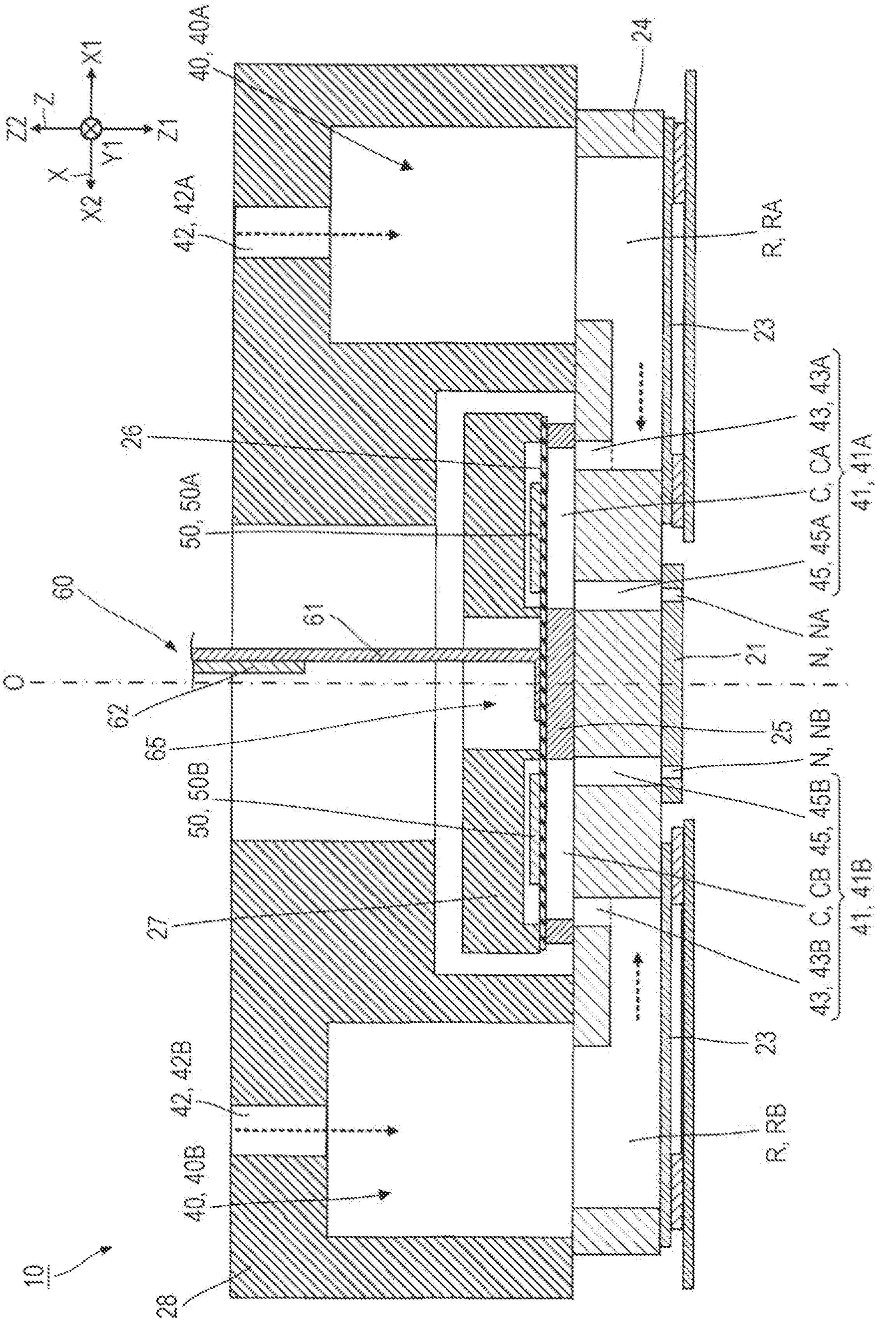
FIG. 1 is a cross sectional view illustrating a liquid discharging head according to a first embodiment.

FIG. 1 is a cross sectional view illustrating a liquid discharging head 10 according to a first embodiment. The liquid discharging head 10 includes a nozzle plate 21, a compliance substrate 23, a communicating plate 24, a pressure chamber substrate 25, a vibration plate 26, a sealing plate 27, and a piezoelectric element 50. In addition, the liquid discharging head 10 incudes a case 28 and a COF 60. COF is an abbreviation of chip on film. In the present embodiment, the liquid discharging head 10 that discharges ink, which is one example of a liquid, will be described. The liquid is not limited to ink, and the liquid discharging head 10 can discharge other liquids.

The thickness direction of the nozzle plate 21, the compliance substrate 23, the communicating plate 24, the pressure chamber substrate 25, the vibration plate 26, the sealing plate 27, and the case 28 extends in the Z-axis direction. The nozzle plate 21 and the compliance substrate 23 are disposed in a bottom portion of the liquid discharging head 10. In the Z2 direction of the nozzle plate 21 and the compliance substrate 23, the communicating plate 24 is disposed. In the Z2 direction of the communicating plate 24, the pressure chamber substrate 25 is disposed. In the Z2 direction of the pressure chamber substrate 25, the vibration plate 26 is disposed. On the vibration plate 26, a plurality of the piezoelectric elements 50 is formed. In the Z2 direction of the vibration plate 26, the sealing plate 27 is disposed. The sealing plate 27 covers the plurality of piezoelectric elements 50. The case 28 is disposed on the communicating plate 24.

Figure 2:
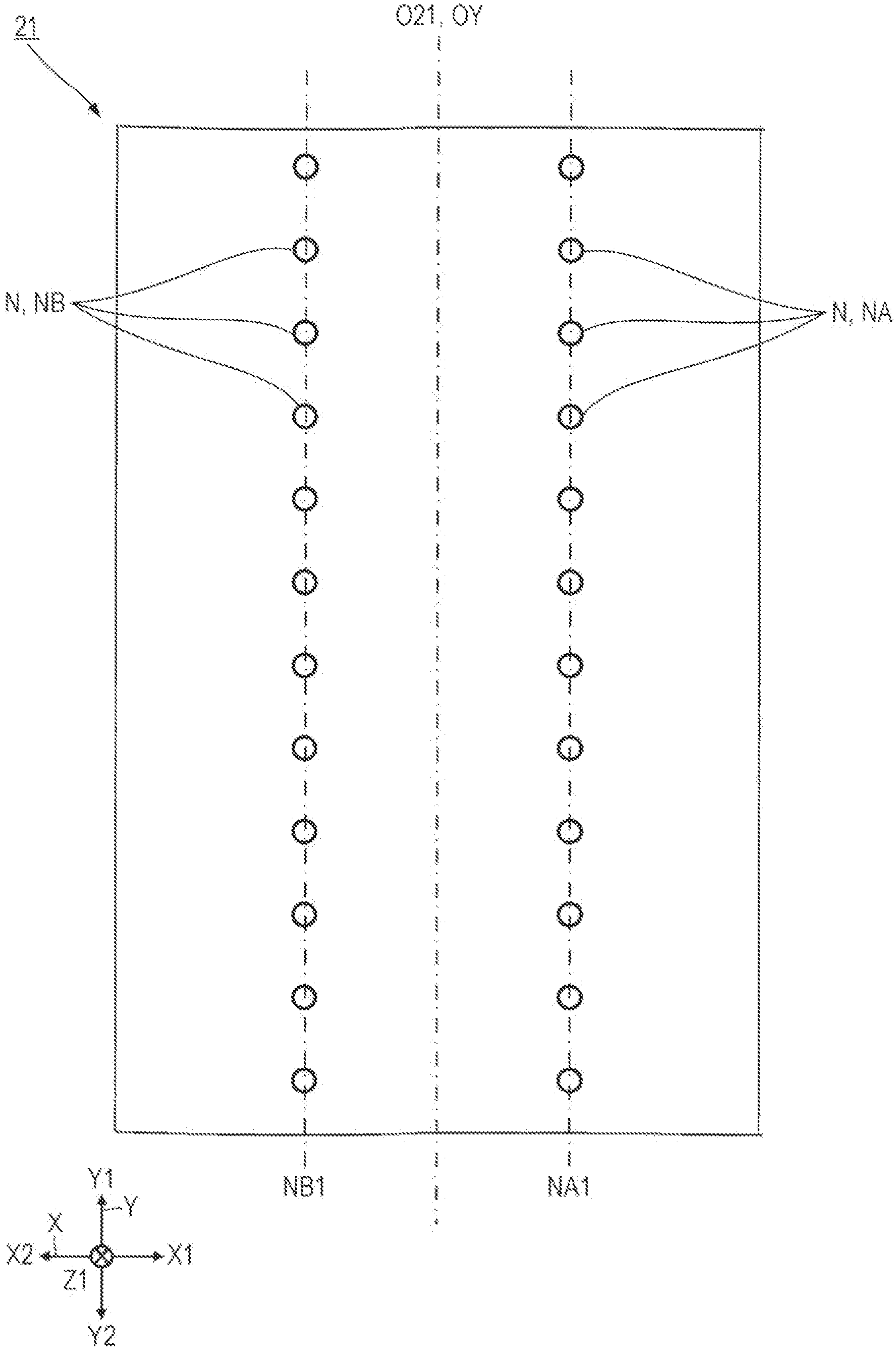
FIG. 2 is a plan view illustrating a nozzle plate.

FIG. 2 is a plan view illustrating the nozzle plate 21. The liquid discharging head 10 has a plurality of nozzle lines, which are a nozzle line NA1 and a nozzle line NB1. The nozzle line NA1 includes a plurality of nozzles NA arranged in the Y-axis direction. The nozzle line NB1 includes a plurality of nozzles NB arranged in the Y-axis direction. The nozzles NA are one example of a first nozzle. The nozzles NB are one example of a second nozzle. Each of the nozzles NA and NB is a through hole that penetrates the nozzle plate 21 in the Z-axis direction. The nozzle line NA1 and the nozzle line NB1 are mutually separated in the X-axis direction. The nozzle line NA1 is located, when viewed in the Z-axis direction, in the X1 direction of a central line O21 of the nozzle plate 21. The nozzle line NB1 is located, when viewed in the Z-axis direction, in the X2 direction of the central line O21 of the nozzle plate 21.

The central line O21 is a virtual straight line passing through the center of the nozzle plate 21 in the X-axis direction and extending in the Y-axis direction. The central line O21 of the nozzle plate 21 is disposed, in the X-axis direction, at a position overlapping a central line O of the liquid discharging head 10 illustrated in FIG. 1. The central line O of the liquid discharging head 10 is a virtual straight line passing through the center of the liquid discharging head 10 in the X-axis direction and extending in the Z-axis direction. The central line O may be a virtual straight line passing through the center of the case 28 in the X-axis direction and extending in the Z-axis direction.

In the liquid discharging head 10, a passage 40 through which ink passes is formed. The passage 40 includes a passage 40A and a passage 40B. The passage 40A includes a passage communicating with the nozzle NA. The passage 40B includes a passage communicating with the nozzle NB. The passage 40A includes a supply port 42A, a common liquid chamber RA, a relay passage 43A, a pressure chamber CA, a communicating passage 45A, and the nozzle NA. The passage 40A includes a plurality of individual passages 41A. The individual passages 41A include the relay passage 43A, the pressure chamber CA, and the communicating passage 45A. The common liquid chamber RA communicates with the plurality of individual passages 41A in common and supplies ink to the plurality of individual passages 41A.

The pressure chamber CA is one example of a first pressure chamber. The individual passages 41A are one example of a first passage. The first passage is a passage through which a liquid can pass and extends from the outside upstream of the pressure chamber CA to the nozzle NA, through the pressure chamber CA. The relay passage 43A is one example of the outside upstream of the pressure chamber CA. The passage through which a liquid can pass to the nozzle NA does not include the nozzle NA. For example, the communicating passage 45A formed in the communicating plate 24 is included in the first passage, and a passage formed in the nozzle plate 21 is not included in the first passage.

Similarly, the passage 40B includes a supply port 42B, a common liquid chamber RB, a relay passage 43B, a pressure chamber CB, a communicating passage 45B, and a nozzle NB. The passage 40B includes a plurality of individual passages 41B. The individual passages 41B include the relay passage 43B, the pressure chamber CB, the communicating passage 45B, and the nozzle NB. The common liquid chamber RB communicates with the plurality of individual passages 41B in common and supplies ink to the plurality of individual passages 41B.

The pressure chamber CB is one example of a second pressure chamber. The individual passages 41B are one example of a second passage. The second passage is a passage through which a liquid can pass and extends from the outside upstream of the pressure chamber CB to the nozzle NB, through the pressure chamber CB. The relay passage 43B is one example of the outside upstream of the pressure chamber CB. The passage through which a liquid can pass to the nozzle NB does not include the nozzle NB. For example, the communicating passage 45B formed in the communicating plate 24 is included in the second passage, and a passage formed in the nozzle plate 21 is not included in the second passage.

Note that when the passage 40A is not distinguished from the passage 40B, the passages 40A and the passage 40B each may be expressed as the passage 40. Similarly, the supply port 42A, the common liquid chamber RA, the relay passage 43A, the pressure chamber CA, the communicating passage 45A, and the nozzle NA, included in the passage 40A, may be expressed as a supply port 42, a common liquid chamber R, a relay passage 43, a pressure chamber C, a communicating passage 45, and a nozzle N. The supply port 42B, the common liquid chamber RB, the relay passage 43B, the pressure chamber CB, the communicating passage 45B, and the nozzle NB, included in the passage 40B, may be expressed as the supply port 42, the common liquid chamber R, the relay passage 43, the pressure chamber C, the communicating passage 45, and the nozzle N.

In addition, as an expression regarding discharge of a liquid that flows in the passage 40A, a line A side may be used. For example, expressions such as the nozzle NA on the line A side, the pressure chamber CA on the line A side, a piezoelectric element 50A on the line A side may be used. Similarly, as an expression regarding discharge of a liquid that flows in the passage 40B, a line B side may be used.

Figure 3:
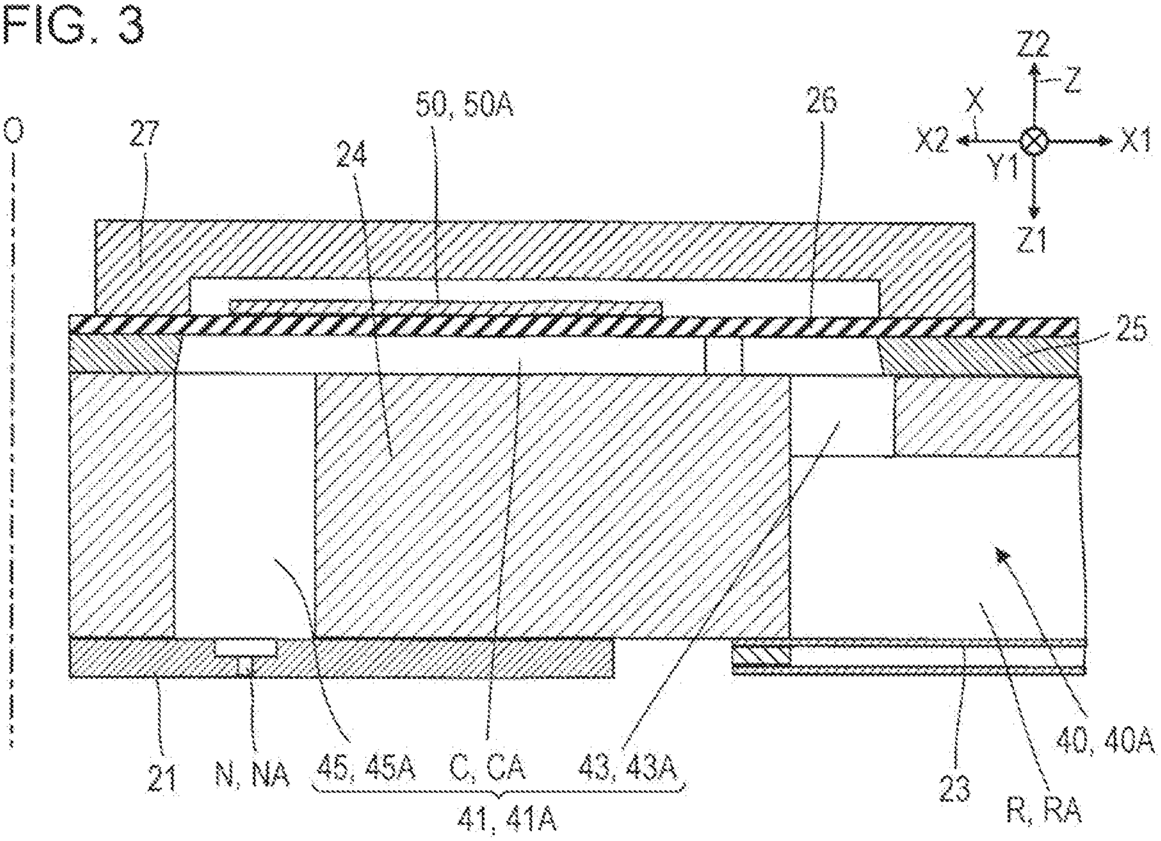
FIG. 3 is a cross sectional view illustrating a pressure chamber and a piezoelectric element on a line A side.

FIG. 3 is a cross sectional view illustrating the pressure chamber CA and the piezoelectric element 50A on the line A side. FIG. 3 enlarges and illustrates main portions of the passage 40A on the line A side in FIG. 1. Ink flowing in the passage 40A passes through the supply port 42A illustrated in FIG. 1 and flows into the common liquid chamber RA. A part of the common liquid chamber RA is formed in the communicating plate 24 and a part of the common liquid chamber RA is formed in the case 28. The ink in the common liquid chamber RA passes through the relay passage 43A and is supplied to the pressure chamber CA. The ink in the pressure chamber CA passes through the communicating passage 45A and is discharged from the nozzle NA. Note that the liquid discharging head 10 can employ a circulation method for circulating ink.

Figure 4:
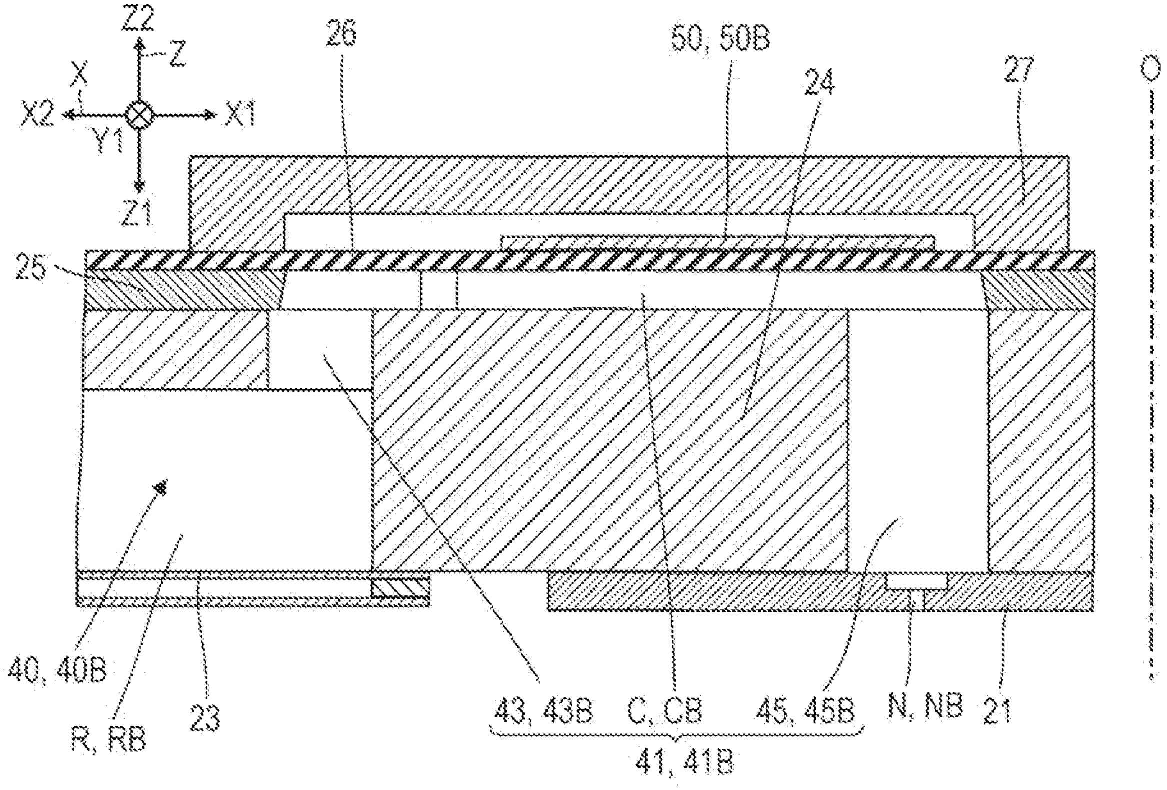
FIG. 4 is a cross sectional view illustrating a pressure chamber and a piezoelectric element on a line B side.

FIG. 4 is a cross sectional view illustrating the pressure chamber CB and a piezoelectric element 50B on the line B side. FIG. 4 enlarges and illustrates main portions of the passage 40B on the line B side in FIG. 1. Ink flowing in the passage 40B passes through the supply port 42B illustrated in FIG. 1 and flows into the common liquid chamber RB. A part of the common liquid chamber RB is formed in the communicating plate 24 and a part of the common liquid chamber RB is formed in the case 28. The ink in the common liquid chamber RB passes through the relay passage 43B and is supplied to the pressure chamber CB. The ink in the pressure chamber CB passes through the communicating passage 45B and is discharged from the nozzle NB.

As illustrated in FIGS. 1, 3, and 4, the compliance substrate 23 is disposed on each side of the nozzle plate 21 in the X-axis direction. The compliance substrate 23 includes a flexible film. The compliance substrate 23 constitutes a bottom surface of each of the common liquid chambers RA and RB. The compliance substrate 23 is deformable under pressure from ink. The compliance substrate 23 is deformed by the ink pressure and can absorb pressure fluctuation of ink in the liquid discharging head 10.

In the communicating plate 24, a part of each of the common liquid chambers RA and RB, the relay passages 43A and 43B, and the communicating passages 45A and 45B are formed. In the communicating plate 24, a through hole, a groove, a recess, or the like is formed. The through hole, groove, recess, or the like forms a part of each of the common liquid chambers RA and RB, the relay passage 43, and the communicating passage 45.

Figure 5:
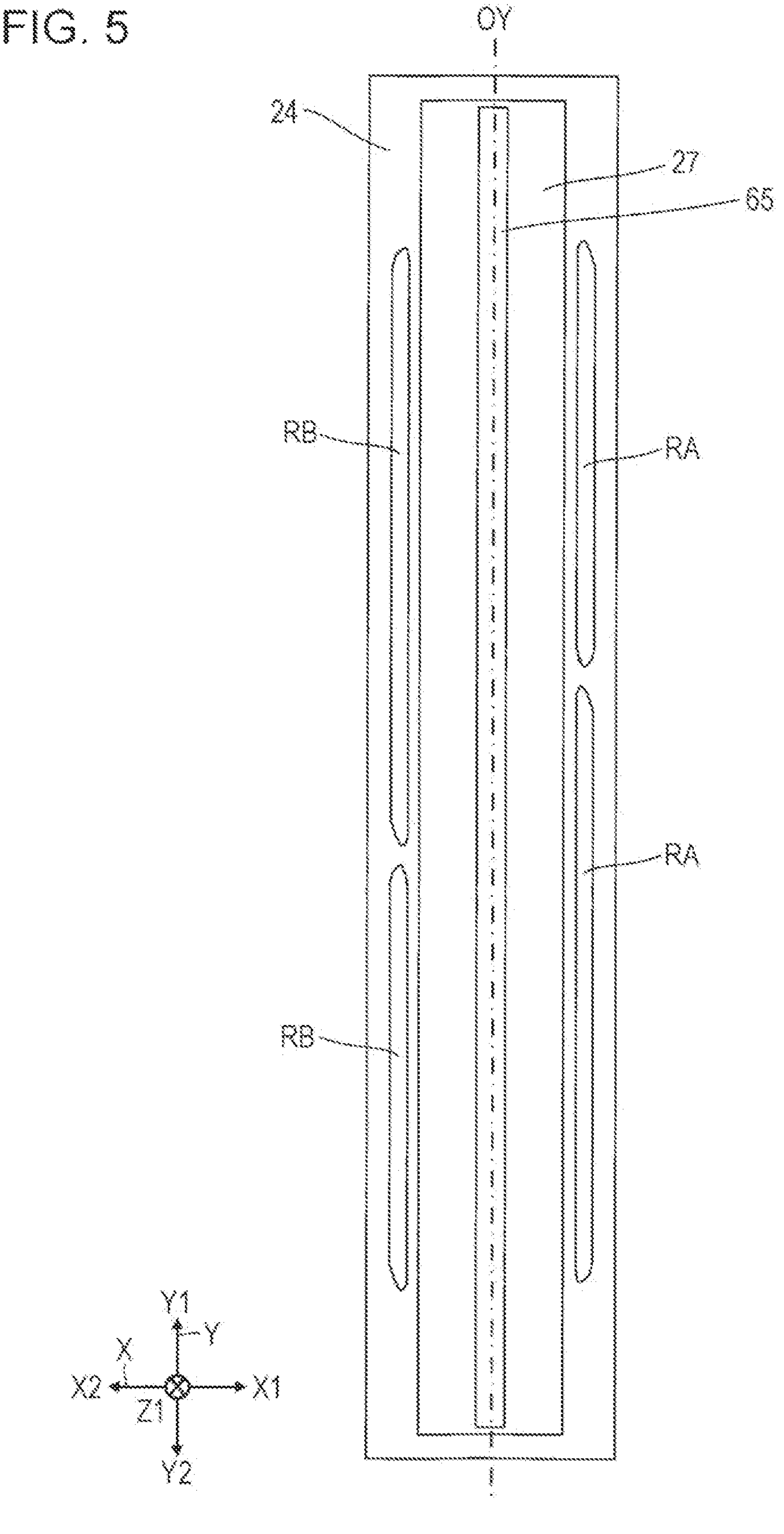
FIG. 5 is a plan view illustrating a communicating plate and a sealing plate.

FIG. 5 is a plan view illustrating the communicating plate 24 and the sealing plate 27. The common liquid chambers RA and RB are long in the Y-axis direction. The common liquid chambers RA and RB correspond to dispositions of the pluralities of nozzles NA and NB in the Y-axis direction. As illustrated in FIG. 1, upper portions of the common liquid chambers RA and RB are formed in the case 28, and lower portions of the common liquid chambers RA and RB are formed in the communicating plate 24. The lower portions of the common liquid chambers RA and RB formed in the communicating plate 24 penetrate in the Z-axis direction. A portion, of the common liquid chamber RA, closer to the nozzles NA is, when viewed in the Z-axis direction, formed and extended to a position overlapping the pressure chamber CA. Similarly, a portion, of the common liquid chamber RB, closer to the nozzles NB is, when viewed in the Z-axis direction, formed and extended to a position overlapping the pressure chamber CB.

The rely passage 43A communicates the pressure chamber CA with the common liquid chamber RA. The relay passage 43A is provided for each of a plurality of the pressure chambers CA. A plurality of the relay passages 43A is disposed at predetermined intervals in the Y-axis direction. The rely passage 43B communicates the pressure chamber CB with the common liquid chamber RB. The relay passage 43B is provided for each of a plurality of the pressure chambers CB. A plurality of the relay passages 43B is disposed at predetermined intervals in the Y-axis direction.

The communicating passage 45A extends in the Z-axis direction and communicates the pressure chamber CA with the nozzles NA. The communicating passage 45A is provided for each of a plurality of the pressure chambers CA. A plurality of the communicating passages 45A is disposed at predetermined intervals in the Y-axis direction. The communicating passage 45B extends in the Z-axis direction and communicates the pressure chamber CB with the nozzles NB. The communicating passage 45B is provided for each of a plurality of the pressure chambers CB. A plurality of the communicating passages 45B is disposed at predetermined intervals in the Y-axis direction.

The communicating passages 45A and 45B penetrate the communicating plate 24 in the Z-axis direction. The communicating passages 45A and 45B are mutually separated in the X-axis direction. Each communicating passage 45A is, when viewed in the Z-axis direction, disposed at a position overlapping the pressure chamber CA. Each communicating passage 45B is, when viewed in the Z-axis direction, disposed at a position overlapping the pressure chamber CB.

Figure 6:
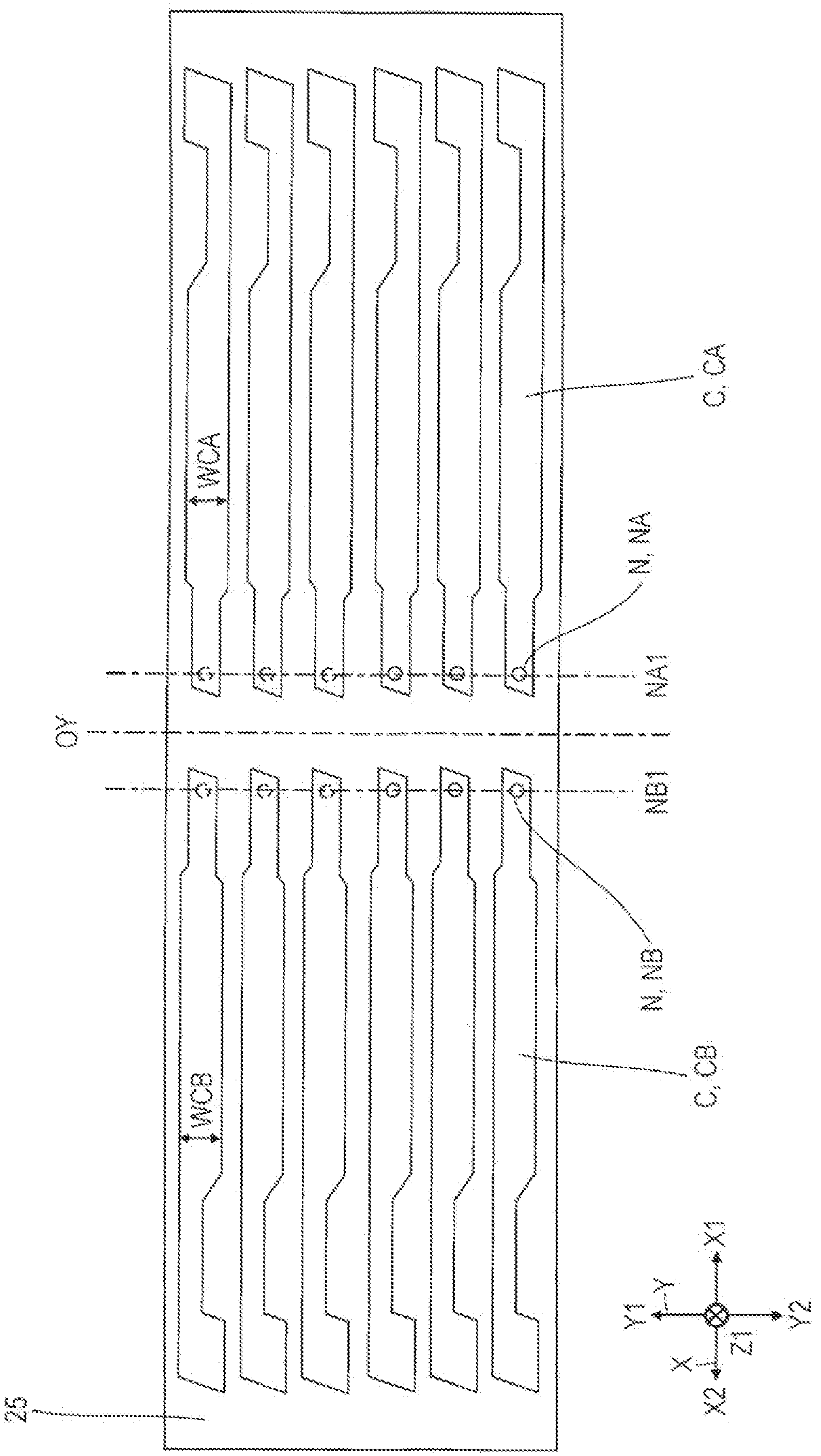
FIG. 6 is a plan view illustrating a pressure chamber substrate on which a pressure chamber is formed.

FIG. 6 is a plan view illustrating the pressure chamber substrate 25. In FIG. 6, positions corresponding to the nozzles NA and NB are indicated by virtual lines. On the pressure chamber substrate 25, pluralities of the pressure chambers CA and CB are formed. The pressure chambers CA and CB penetrate the pressure chamber substrate 25 in the Z-axis direction. The pressure chambers CA and CB are mutually separated in the X-axis direction. Each of the plurality of pressure chambers CA is provided for each of the plurality of nozzles NA. The plurality of pressure chambers CA is disposed at predetermined intervals in the Y-axis directions. Each of the plurality of pressure chamber CB is provided for each of the plurality of nozzles NB. The plurality of pressure chambers CB is disposed at predetermined intervals in the Y-axis directions. The pressure chamber substrate 25 can be manufactured from, for example, a silicon single crystal substrate. The pressure chamber substrate 25 may be manufactured from another material.

Figure 7:
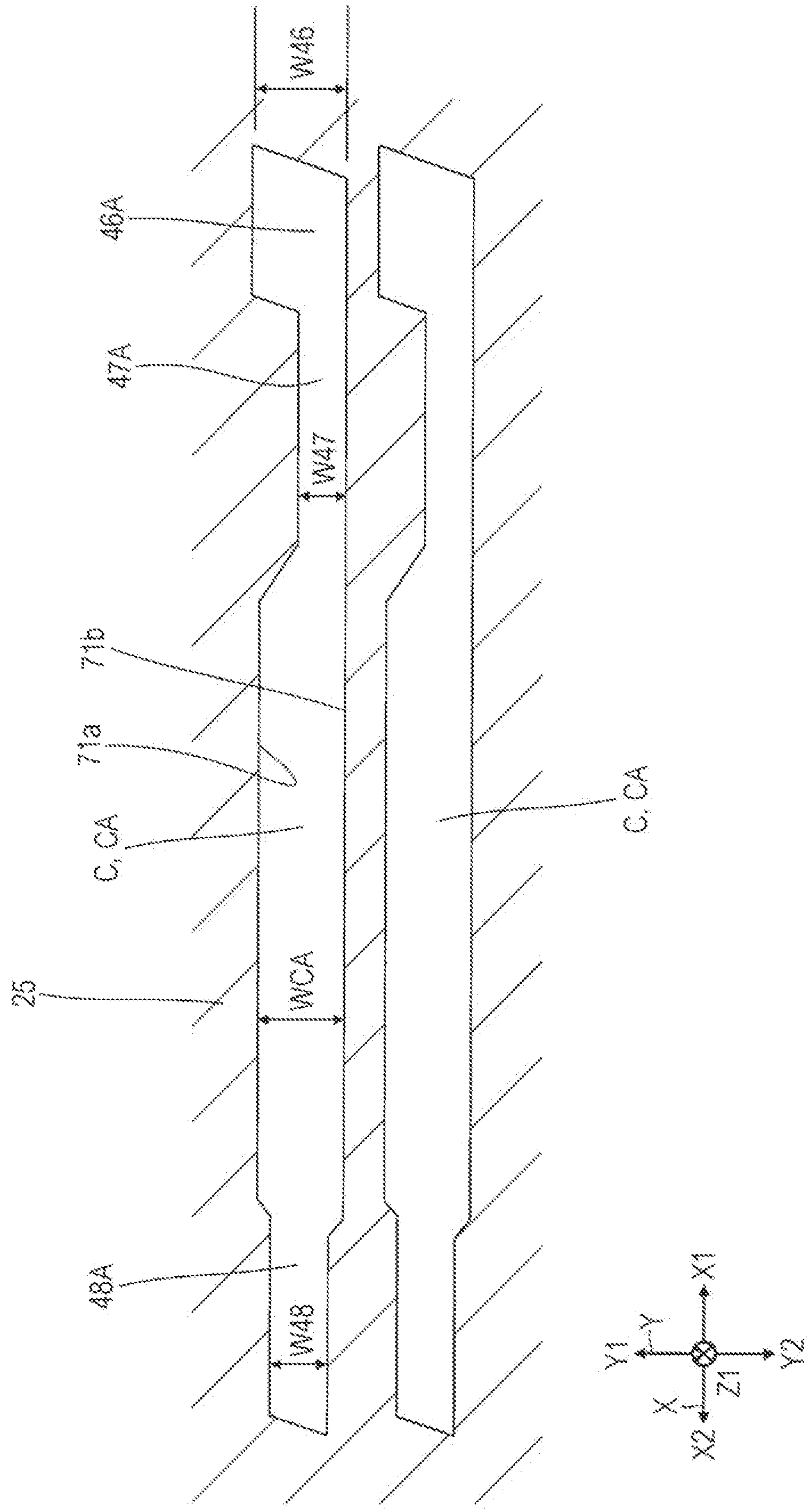
FIG. 7 is a cross sectional view of the pressure chamber substrate and is an enlarged view illustrating a pressure chamber CA on the line A side.

FIG. 7 is a cross sectional view of the pressure chamber substrate 25 and enlarges the pressure chambers CA on the line A side. The cross section illustrated in FIG. 7 is a cross section along the X-Y plane. A relay chamber 46A and a supply port 47A are provided upstream of each pressure chamber CA. A communicating chamber 48A is provided downstream of the pressure chamber CA. The relay chamber 46A, the supply port 47A, and the communicating chamber 48A are formed on the pressure chamber substrate 25. The relay chamber 46A communicates with the relay passage 43A. The supply port 47A communicates the relay chamber 46A with the pressure chamber CA. The communicating chamber 48A communicates the pressure chamber CA with the communicating passage 45A. A width W47 of the supply port 47A in the Y-axis direction is narrower than a width WCA of the pressure chamber CA in the Y-direction. A width W46 of the relay chamber 46A in the Y-axis direction has a length as the same degree as the width WCA of the pressure chamber CA. A width W48 of the communicating chamber 48A in the Y-axis direction is narrower than the width WCA of the pressure chamber CA.

Figure 8:
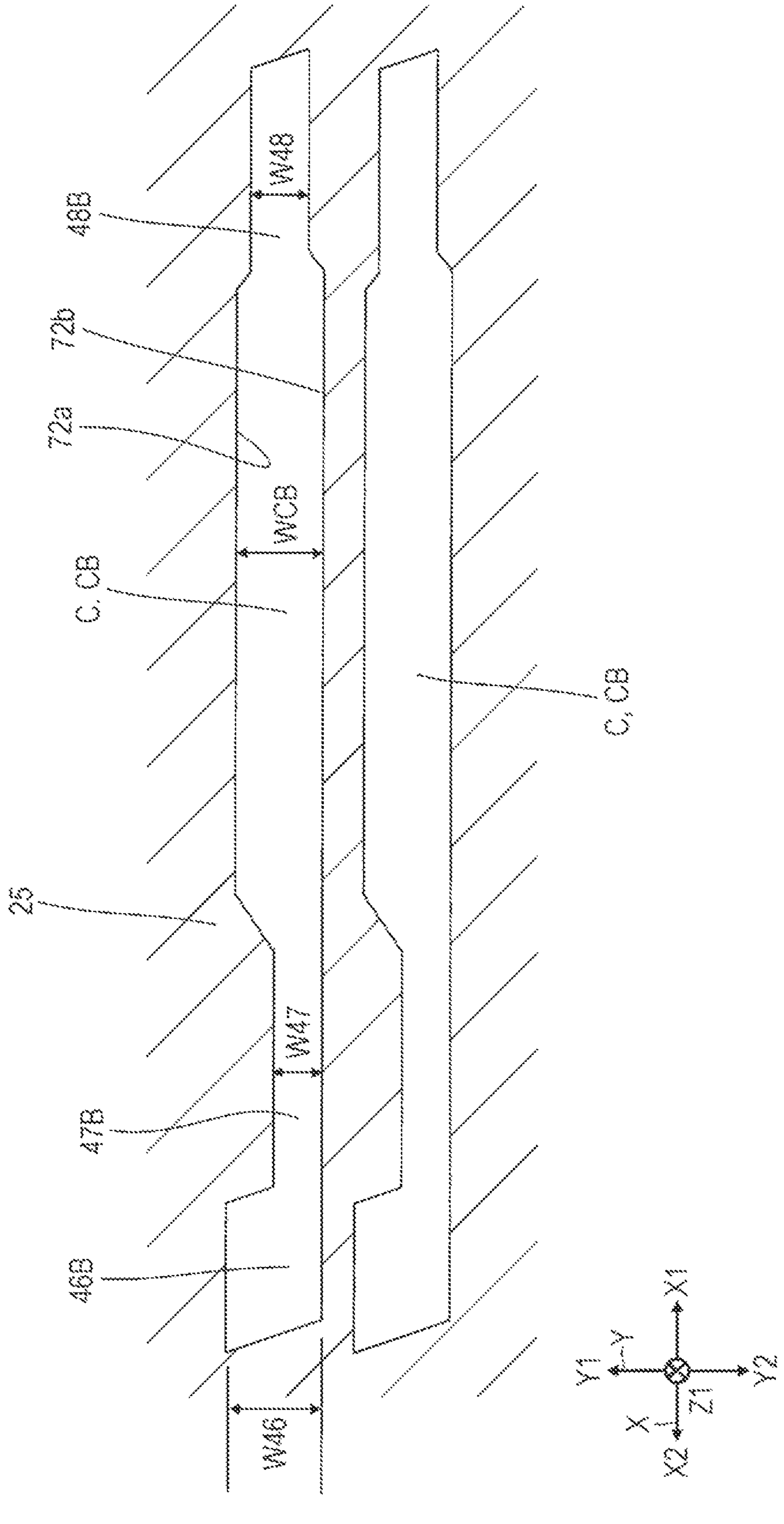
FIG. 8 is a cross sectional view of the pressure chamber substrate and is an enlarged view illustrating a pressure chamber CB on the line B side.

FIG. 8 is a cross sectional view of the pressure chamber substrate 25 and enlarges the pressure chambers CB on the line B side. The cross section illustrated in FIG. 8 is a cross section along the X-Y plane. A relay chamber 46B and a supply port 47B are provided upstream of each pressure chamber CB. A communicating chamber 48B is provided downstream of the pressure chamber CB. The relay chamber 46B, the supply port 47B, and the communicating chamber 48B are formed on the pressure chamber substrate 25. The relay chamber 46B communicates with the relay passage 43B. The supply port 47B communicates the relay chamber 46B with the pressure chamber CB. The communicating chamber 48B communicates the pressure chamber CB with the communicating passage 45B. The width W47 of the supply port 47B in the Y-axis direction is narrower than a width WCB of the pressure chamber CB in the Y-direction. The width W46 of the relay chamber 46B in the Y-axis direction has a length as the same degree as the width WCB of the pressure chamber CB. The width W48 of the communicating chamber 48B in the Y-axis direction is narrower than the width WCB of the pressure chamber CB.

In the liquid discharging head 10, the width WCB of the pressure chamber CB on the line B side is longer than the width WCA of the pressure chamber CA on the line A side. Details will be described later.

Figure 9:
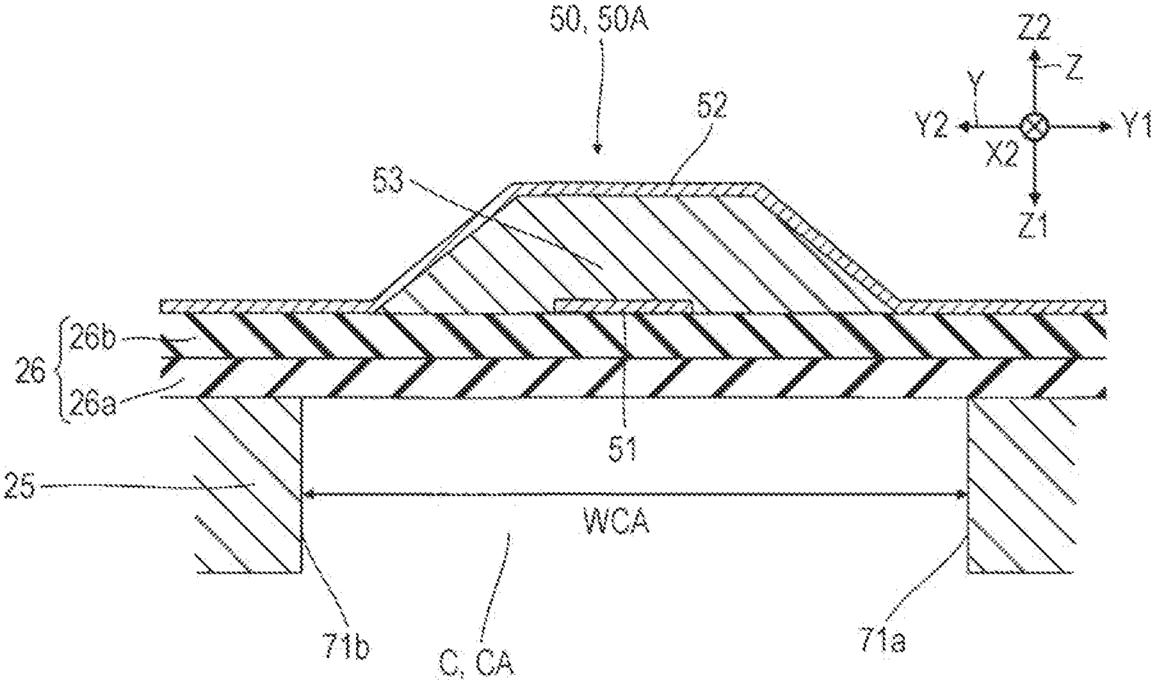
FIG. 9 is a cross sectional view illustrating the pressure chamber and the piezoelectric element on the line A side and is a view illustrating a cross section along a Y-Z plane.
Figure 10:
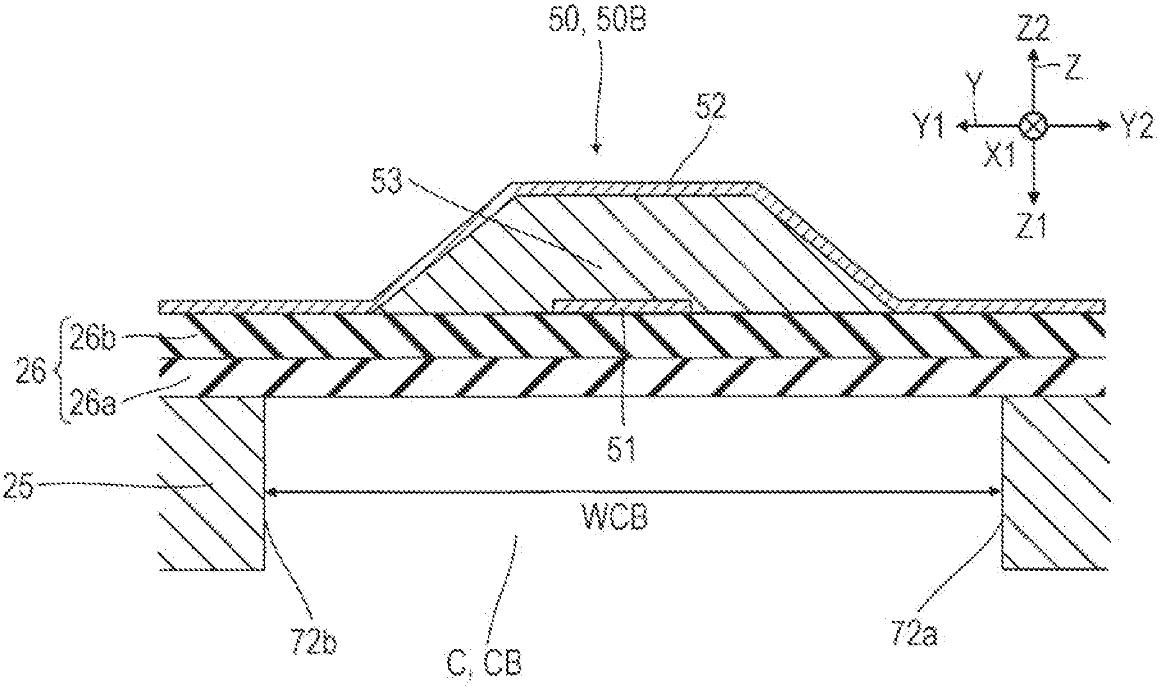
FIG. 10 is a cross sectional view illustrating the pressure chamber and the piezoelectric element on the line B side and is a view illustrating a cross section along the Y-Z plane.
Figure 11:
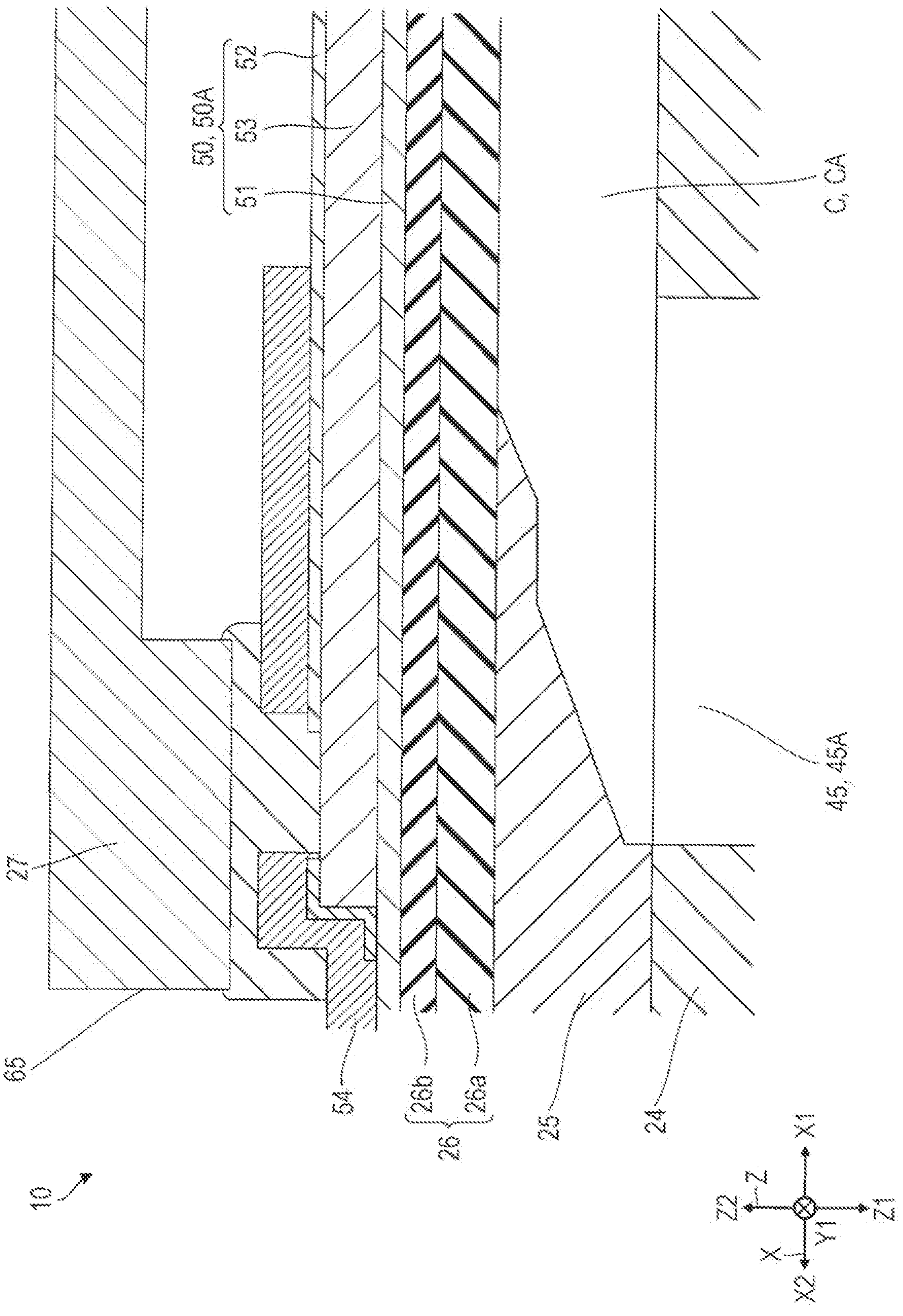
FIG. 11 is an enlarged view illustrating main portions of a vibration plate and the piezoelectric element and is a view illustrating a cross section along the X-Z plane.

FIG. 9 is a cross sectional view illustrating the pressure chamber CA and the piezoelectric element 50A on the line A side and is a view illustrating a cross section along the Y-Z plane. FIG. 10 is a cross sectional view illustrating the pressure chamber CB and the piezoelectric element 50B on the line B side and is a view illustrating a cross section along the Y-Z plane. FIG. 11 is an enlarged view illustrating main portions of the vibration plate 26 and the piezoelectric element 50 and is a view illustrating a cross section along the X-Z plane. The vibration plate 26 is disposed on the upper surface of the pressure chamber substrate 25. The vibration plate 26 covers an opening of the pressure chamber substrate 25. A portion, of the vibration plate 26, covering the opening of the pressure chamber substrate 25 constitutes an upper wall surface of each of the pressure chambers CA and CB.

Figure 17:
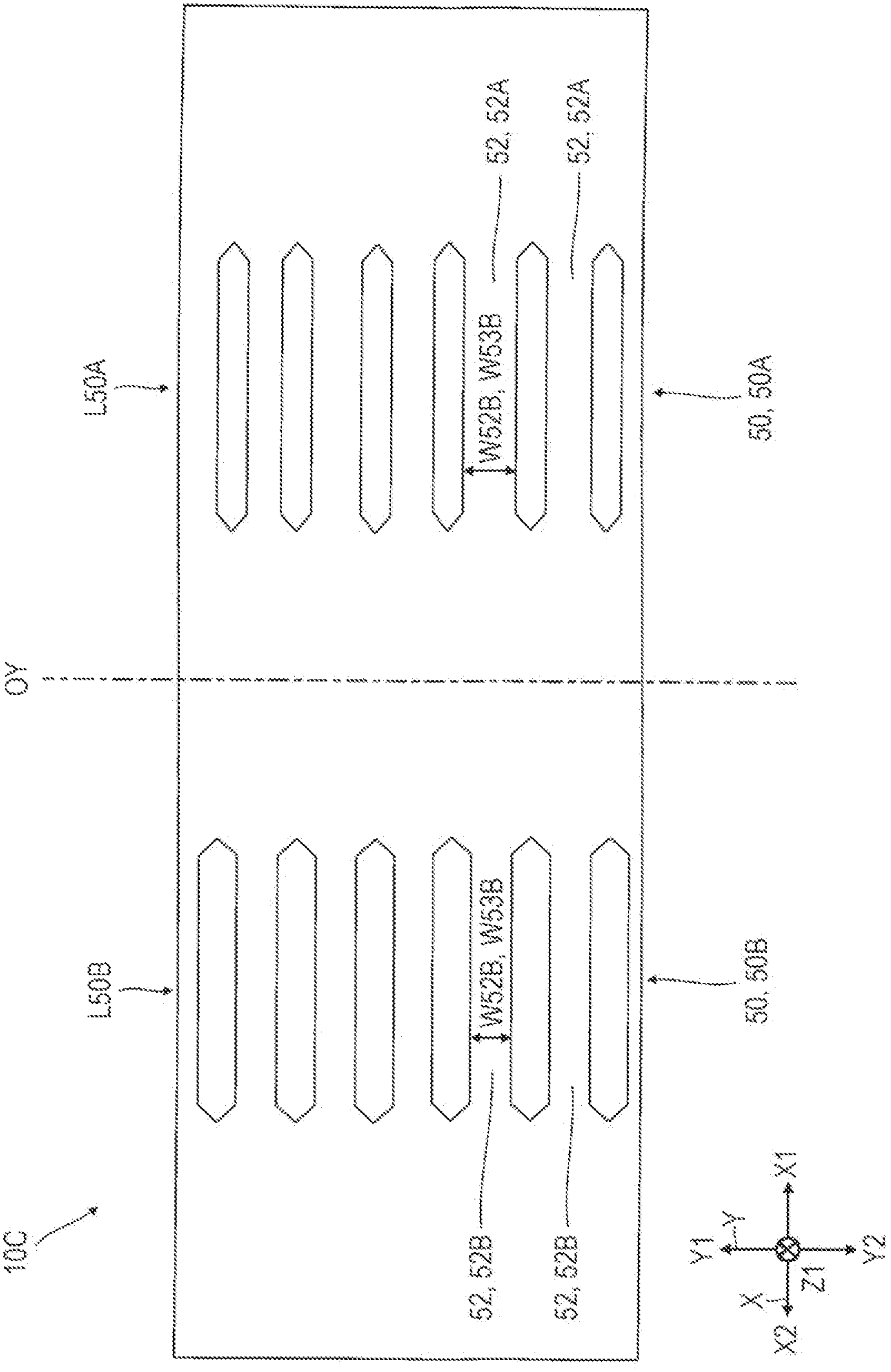
FIG. 17 is a plan view illustrating an electrode of a piezoelectric element of a liquid discharging head according to a third embodiment.

On the vibration plate 26, pluralities of the piezoelectric elements 50A and 50B are formed. The piezoelectric elements 50A are disposed at positions overlapping the pressure chambers CA when viewed in the Z-axis direction. Each of the piezoelectric elements 50A is provided for each of the pressure chambers CA. The piezoelectric elements 50B are disposed at positions overlapping the pressure chambers CB when viewed in the Z-axis direction. Each of the piezoelectric elements 50B is provided for each of the pressure chambers CB. In correspondence with the position of the plurality of pressure chambers CA, the plurality of piezoelectric elements 50A forms a first piezoelectric element line L50A arranged along a central line OY. In correspondence with the position of the plurality of pressure chambers CB, the plurality of the piezoelectric elements 50B forms a second piezoelectric element line L50B arranged along the central line OY. The first piezoelectric element line L50A and the second piezoelectric element line L50B are illustrated in FIG. 17. The central line OY passes through the center of the liquid discharging head 10 in the X-axis direction and is a virtual line extending in the Y-axis direction. The central line OY is one example of a first virtual line and a second virtual line.

The vibration plate 26 includes an elastic layer 26*a* and an insulating layer 26*b*. The elastic layer 26*a* is made of, for example, silicon dioxide ($SiO_2$). The insulating layer 26*b* is made of, for example, zirconium oxide ($ZrO_2$). The elastic layer 26*a* is formed on the pressure chamber substrate 25, and the insulating layer 26*b* is formed on the elastic layer 26*a*.

The vibration plate 26 is driven by the piezoelectric element 50 and vibrates in the Z-axis direction. The vibration plate 26 that forms the upper wall surface of each pressure chamber CA is driven by each piezoelectric element 50A. The vibration plate 26 that forms the upper wall surface of each pressure chamber CB is driven by each piezoelectric element 50B. The total thickness of the vibration plate 26 is, for example, equal to or less than 2 μm. The total thickness of the vibration plate 26 may be equal to or less than 15 μm, equal to or less than 40 μm, or equal to or less than 100 μm. For example, when the total thickness of the vibration plate 26 is equal to or less than 15 μm, a resin layer may be included. The vibration plate 26 is preferably formed of a metal. Examples of the metal include stainless steel, nickel, and the like. When the vibration plate 26 is formed of metal, the thickness of the vibration plate 26 may be equal to or more than 15 μm and equal to and less than 100 μm.

The piezoelectric elements 50A and 50B each include electrodes 51 and 52, and a piezoelectric laminate 53. The electrode 51, the piezoelectric laminate 53, and the electrode 52 are laminated on the vibration plate 26 in this order. The piezoelectric laminate 53 is sandwiched by the electrode 51 and the electrode 52. The electrode 51 is an individual electrode, and the electrode 52 is a common electrode. Note that the electrode 51 closer to the pressure chamber C may be a common electrode, and the electrode 52 farther from the pressure chamber C may be an individual electrode. The electrode 51 is, when viewed in the Z-axis direction, disposed at a position overlapping each of the plurality of pressure chambers CA and CB.

The electrode 51 includes an underlayer and an electrode layer. The underlayer contains, for example, titanium (Ti). The electrode layer contains, for example, a low resistance conductive material such as platinum (Pt), iridium (Ir), and the like. The electrode layer may be formed of, for example, an oxide such as strontium ruthenate ($SrRuO_3$), lanthanum nickel oxide ($LaNiO_3$), and the like. The piezoelectric laminate 53 is disposed so as to cover a plurality of the electrodes 51. The piezoelectric laminate 53 is a belt-like dielectric film extending in the Y-axis direction. The piezoelectric laminate 53 is formed of, for example, a known piezoelectric film such as lead zirconate titanate ($Pb(Zr, Ti) O_3$), ceramic, and the like.

The electrode 52 includes an underlayer and an electrode layer. The underlayer contains, for example, titanium. The electrode layer contains, for example, a low resistance conductive material such as platinum, iridium, and the like. The electrode layer may be formed of, for example, an oxide such as strontium ruthenate, lanthanum nickel oxide, and the like. A region, of the piezoelectric laminate 53, between the electrodes 51 and 52 is a driving region. The driving region is formed on each of the pluralities of pressure chambers CA and CB.

As illustrated in FIG. 11, a lead electrode 54 is electrically coupled to the piezoelectric element 50. The lead electrode 54 is coupled to each of the plurality of individual electrodes 51. A plurality of the lead electrodes 54 extends in the X-axis direction and is led out into an opening 65 of the sealing plate 27. Note that, in FIGS. 1, 3, and 4, the lead electrodes 54 are omitted. The opening 65 penetrates the sealing plate 27 in the Z-axis direction. When viewed in the Z-axis direction, each lead electrode 54 is electrically coupled to the COF 60 at a position corresponding to the opening 65. The lead electrode 54 is formed of a conductive material whose resistance is lower than each electrode 51. For example, the lead electrode 54 is a conductive pattern having a structure in which a conductive film made of gold (Au) laminated on a surface of a conductive film formed of nichrome (NiCr).

As illustrated in FIG. 5, the sealing plate 27 has a rectangular shape when viewed in the Z-axis direction. The sealing plate 27 protects the pluralities of piezoelectric elements 50A and 50B and reinforces the mechanical strength of the pressure chamber substrate 25 and the vibration plate 26. The sealing plate 27 is adhered to the vibration plate 26 by, for example, an adhesive. The sealing plate 27 is fixed to the pressure chamber substrate 25 via the vibration plate 26.

As illustrated in FIG. 1, the COF 60 includes a flexible wiring substrate 61 and a driving circuit 62. The flexible wiring substrate 61 is a wiring substrate that is flexible. The flexible wiring substrate 61 is, for example, a flexible printed circuit (FPC). The flexible wiring substrate 61 may be, for example, a flexible flat cable (FFC). FPC is an abbreviation of flexible printed circuit. FFC is an abbreviation of flexible flat cable.

The flexible wiring substrate 61 is coupled to the piezoelectric elements 50A and 50B via the lead electrode 54. The flexible wiring substrate 61 is electrically coupled to a circuit substrate (not illustrated). The circuit substrate includes a driving signal generation circuit 32 illustrated in FIG. 33.

The driving circuit 62 is mounted on the flexible wiring substrate 61. The driving circuit 62 includes a switching element for driving the piezoelectric elements 50A and 50B. The driving circuit 62 is electrically coupled to a control unit 30 illustrated in FIG. 33 via the flexible wiring substrate 61 and the circuit substrate. The driving circuit 62 receives a driving signal Com output from the driving signal generation circuit 32. The switching element of the driving circuit 62 switches whether or not to supply the driving signal Com generated in the driving signal generation circuit 32 to the piezoelectric elements 50A and 50B. The driving circuit 62 supplies a driving voltage or current to the piezoelectric elements 50A and 50B to vibrate the vibration plate 26.

Figure 12:
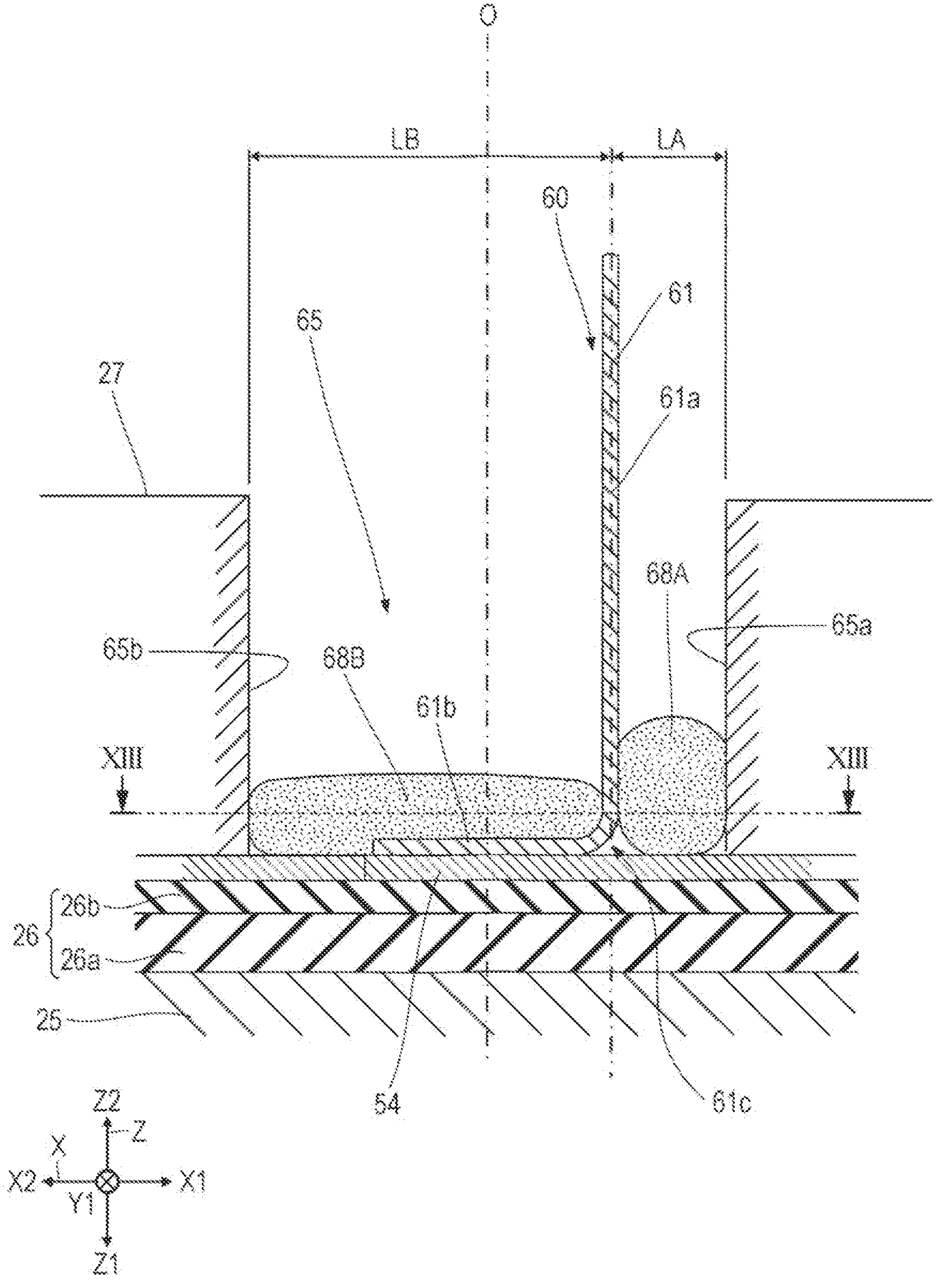
FIG. 12 is a cross sectional view illustrating a chip on film (COF) and an adhesive disposed in an opening of the sealing plate.
Figure 13:
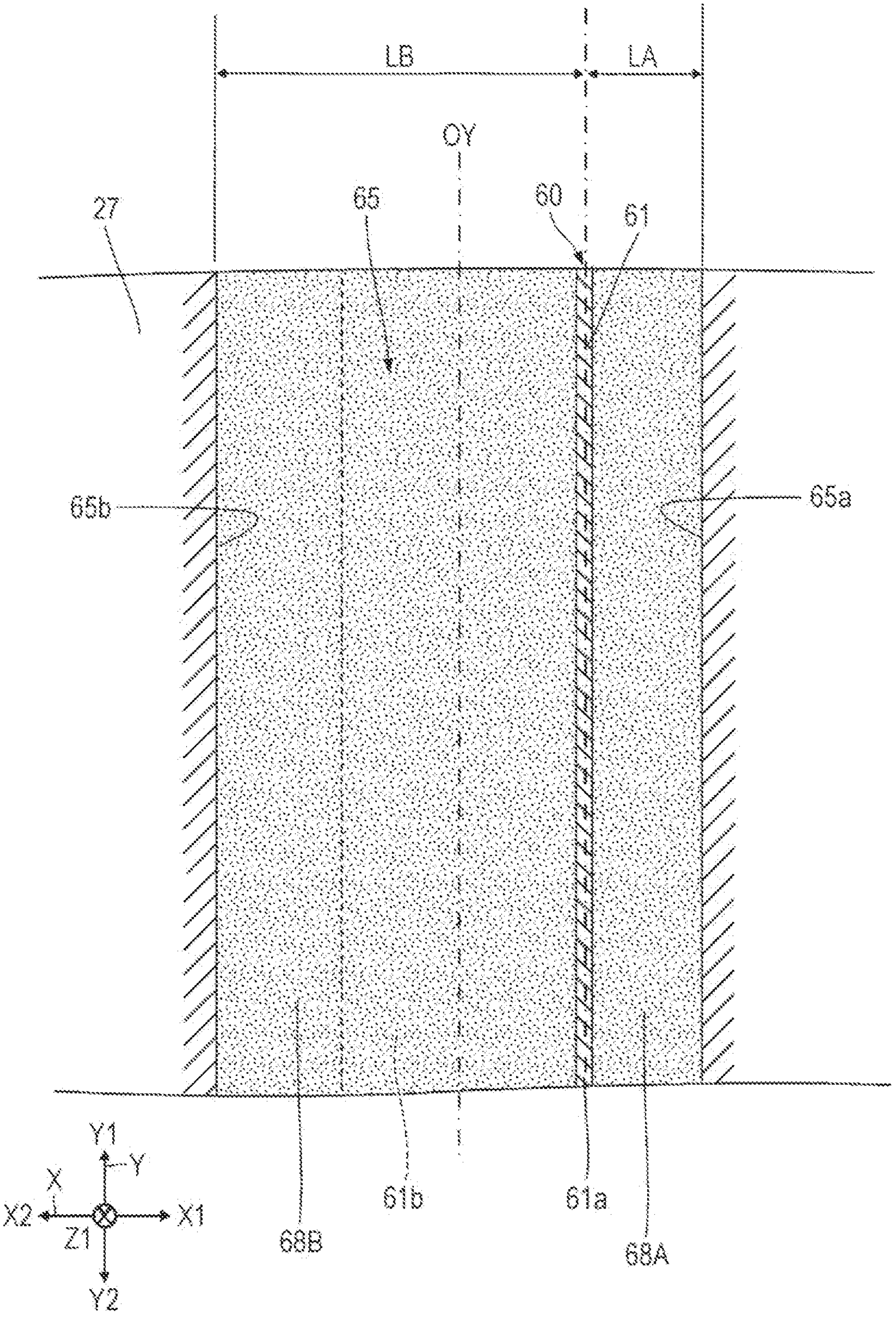
FIG. 13 is a cross sectional view illustrating a cross section taken along line XIII-XIII in FIG. 12.

Next, with reference to FIGS. 12 and 13, the coupling structure of the COF 60 and the lead electrode 54 will be described. FIG. 12 is a cross sectional view illustrating the COF 60 and adhesives 68A and 68B disposed in the opening 65 of the sealing plate 27. FIG. 13 is a cross sectional view illustrating a cross section taken along line XIII-XIII in FIG. 12. The opening 65 of the sealing plate 27 is a space between a wall surface 65*a* and a wall surface 65*b* mutually separated in the X-axis direction. The flexible wiring substrate 61 of the COF 60 includes a main body portion 61*a* extending in the Z-axis direction and a terminal 61*b* bent from the main body portion 61*a*. When viewed in the Y-axis direction, the main body portion 61*a* is located on the line A side from the central line O of the liquid discharging head 10. In other words, the main body portion 61*a* is, in the X-axis direction, disposed at a position closer to the wall surface 65*a* than the wall surface 65*b*. In the X-axis direction, a length LB from the main body portion 61*a* to the wall surface 65*b* is longer than a length LA from the main body portion 61*a* to the wall surface 65*a*. The terminal 61*b* stretches out in the X2 direction toward the wall surface 65*b* from a bending point 61*c*. Note that the central line O extends in the Z-axis direction, passing through the center of the opening 65 in the X-axis direction. The central line OY illustrated in FIG. 13 extends in the Y-axis direction, passing through the center of the opening 65 in the X-axis direction.

The terminal 61*b* is bent from the lower end portion of the main body portion 61*a* and stretches out toward the line B side. The terminal 61*b* stretches out toward the line B side from the central line O of the liquid discharging head 10. In other words, the terminal 61*b* stretches out and extends to a position toward the wall surface 65*b* from the central line OY in X-axis direction. The thickness direction of the main body portion 61*a* extends in the X-axis direction. The thickness direction of the terminal 61*b* extends in the Z-axis direction. The terminal 61*b* is electrically coupled to the lead electrode 54 located in the Z1 direction of the terminal 61*b*.

The adhesives 68A and 68B are disposed in the opening 65 of the sealing plate 27. The lower end portion of the flexible wiring substrate 61 is covered with the adhesives 68A and 68B. The adhesive 68A exists between the main body portion 61*a* of the flexible wiring substrate 61 and the wall surface 65*a*. The adhesive 68B exists between the main body portion 61*a* of the flexible wiring substrate 61 and the wall surface 65*b*. The adhesive 68B is disposed on the terminal 61*b* of the flexible wiring substrate 61. The terminal 61*b* is covered with the adhesive 68B. The volume of the adhesive 68B is larger than the volume of the adhesive 68A. In addition, since the inside of the opening 65 is filled with the adhesives 68A and 68B, when viewed in the Z-axis direction, the lead electrode 54, the electrode 51, the vibration plate 26, and the like that exist in the opening 65 are not exposed to the outside of the sealing plate 27.

The adhesives 68A and 68B are non-conductive adhesives not containing a conductor such as a conductive particle. The adhesives 68A and 68B each are, for example, a non-conductive paste (NCP). Alternatively, the adhesives 68A and 68B each may be a non-conductive film (NCF).

Alternatively, the adhesives 68A and 68B each may be an anisotropic conductive adhesive in which a plurality of conductive particles is dispersed. The anisotropic conductive adhesive may be, for example, an anisotropic conductive paste (ACP). The anisotropic conductive adhesive may be an anisotropic conductive film (ACF). When the adhesives 68A and 68B each are a non-conductive adhesive, high density mounting can be performed more easily than an ACF or an ACP. The adhesives 68A and 68B each may be, for example, a potting agent or a sealing agent. The adhesive 68A may contain a plurality of kinds of adhesives. The adhesive 68B may contain a plurality of kinds of adhesives.

The flexible wiring substrate 61 is adhered to the sealing plate 27 with the adhesives 68A and 68B. The flexible wiring substrate 61 is adhered with the adhesives 68A and 68B, and, via the vibration plate 26 and the lead electrode 54, is fixed to the pressure chamber substrate 25. Note that the flexible wiring substrate 61 may be electrically coupled to the lead electrode 54 using crimping, soldering, and the like. The adhesives 68A and 68B may be provided so as to cover such a coupling structure. By providing the adhesives 68A and 68B in the opening 65, the flexible wiring substrate 61 is fixed to the pressure chamber substrate 25 and the sealing plate 27. The flexible wiring substrate 61 may have a structure in which the flexible wiring substrate 61 is fixed to the pressure chamber substrate 25 or the sealing plate 27 by the adhesives 68A and 68B. The adhesive 68A is one example of an adhesive having a first amount existing on a side of the first piezoelectric element line, of a joint between the flexible wiring substrate 61 and the pressure chamber substrate 25 or the vibration plate 26. The adhesive 68B is one example of an adhesive having a second amount existing on a side of the second piezoelectric element line, of the joint between the flexible wiring substrate 61 and the pressure chamber substrate 25 or the vibration plate 26. The adhesive of the joint between the flexible wiring substrate 61 and the pressure chamber substrate 25 or the vibration plate 26 is, for example, the adhesive in the opening 65 of the sealing plate 27. In addition, in the opening 65, there is a portion where the vibration plate 26 does not exist, and the pressure chamber substrate 25 and the adhesives 68A and 68B may directly come into contact.

Next, with reference to FIGS. 7 to 10, the width WCA of the pressure chamber CA and the width WCB of the pressure chamber CB will be described. The width WCB of the pressure chamber CB is wider than the width WCA of the pressure chamber CA. The pressure chamber CA is a space between wall surfaces 71*a* and 71*b* mutually separated in the Y-axis direction. The wall surface 71*a* is located in the Y1 direction from the wall surface 71*b*. The width WCA of the pressure chamber CA is a distance between the wall surface 71*a* and the wall surface 71*b* in the Y-axis direction.

The pressure chamber CB is a space between wall surfaces 72*a* and 72*b* mutually separated in the Y-axis direction. The wall surface 72*a* is located in the Y1 direction from the wall surface 72*b*. The width WCB of the pressure chamber CB is a distance between the wall surface 72*a* and the wall surface 72*b* in the Y-axis direction. The volume of the pressure chamber CB is larger than the volume of the pressure chamber CA. The amount of liquid that can be stored in the pressure chamber CB is larger than the amount of liquid that can be stored in the pressure chamber CA.

In the liquid discharging head 10, the volume of the adhesive 68A disposed in the opening 65 and the volume of the adhesive 68B are different. The volume of the adhesive 68B is larger than the volume of the adhesive 68A. The adhesive 68A having the first amount exists on the piezoelectric element 50A side of the flexible wiring substrate 61, and the adhesive 68B having the second amount that is larger than the first amount exists on the piezoelectric element 50B side of the flexible wiring substrate 61. When the volumes of the adhesives 68A and 68B are different, a resonance frequency of a discharging unit on the line A side differs from a resonance frequency of a discharging unit on the line B side. A difference is generated in the resonance frequency, as a result of which a difference may be generated between the liquid discharging performance by the piezoelectric element 50A on the line A side and the liquid discharging performance by the piezoelectric element 50B on the line B side.

Note that the resonance frequency is a frequency that resonates with a natural vibration period Tc. The natural vibration period Tc is calculated by, for example, the following formula 1. In the formula 1, the direction of a unit length extends, for example, in the vibration direction of ink. Ms is an equivalent inertial mass [kg/m$^4$] in the relay passage 43 for supplying ink to the pressure chamber C. Ci is a volume change of ink [m$^3$/Pa] per unit pressure in the pressure chamber C. Cv is a volume change of the pressure chamber C [m$^3$/Pa] per unit pressure in the pressure chamber C.

$$Tc=2\pi\{Ms\times(Ci+Cv)\}^{1/2} \quad 1$$

For example, in a liquid discharging head according to the conventional technique, when an adhesive disposed so as to cover the coupling portion of the flexible wiring substrate 61 and the lead electrode 54 is cured and contracted, a difference may be generated in contraction of the adhesive disposed on each side of the flexible wiring substrate 61. In this case, the adhesive whose amount is larger may have a higher contraction amount than the adhesive whose amount is smaller. Accordingly, due to the difference in the contraction amount, stress of the vibration plate 26 may be generated. As a result, the resonance frequency differs between the line A side and the line B side, and a difference may be generated between the liquid discharging characteristics by the piezoelectric element on the line A side and the liquid discharging characteristics by the piezoelectric element on the line B side.

In the liquid discharging head 10 of the present embodiment, the width WCB of the pressure chamber CB is wider than the width WCA of the pressure chamber CA. Accordingly, the difference in the resonance frequency in the discharging unit on the line A side and the resonance frequency in the discharging unit on the line B side can be reduced. As a result, the difference between the discharging performance in the discharging unit on the line A side and the discharging performance in the discharging unit on the line B side can be reduced. As a result, the discharging performance of the liquid discharged from the nozzles NA and NB can be made approximately equivalent.

Figure 14:
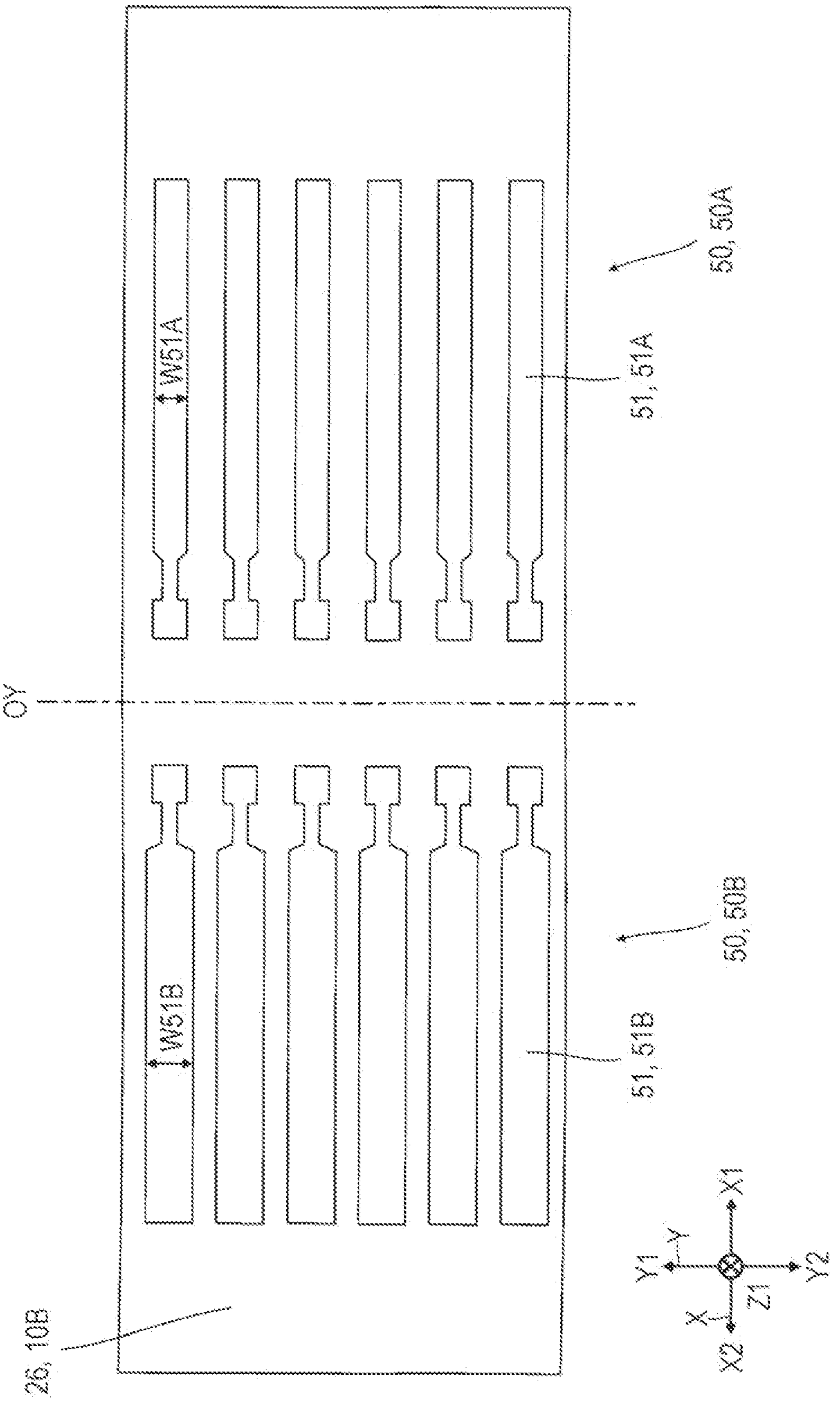
FIG. 14 is a plan view illustrating an electrode of a piezoelectric element of a liquid discharging head according to a second embodiment.
Figure 15:
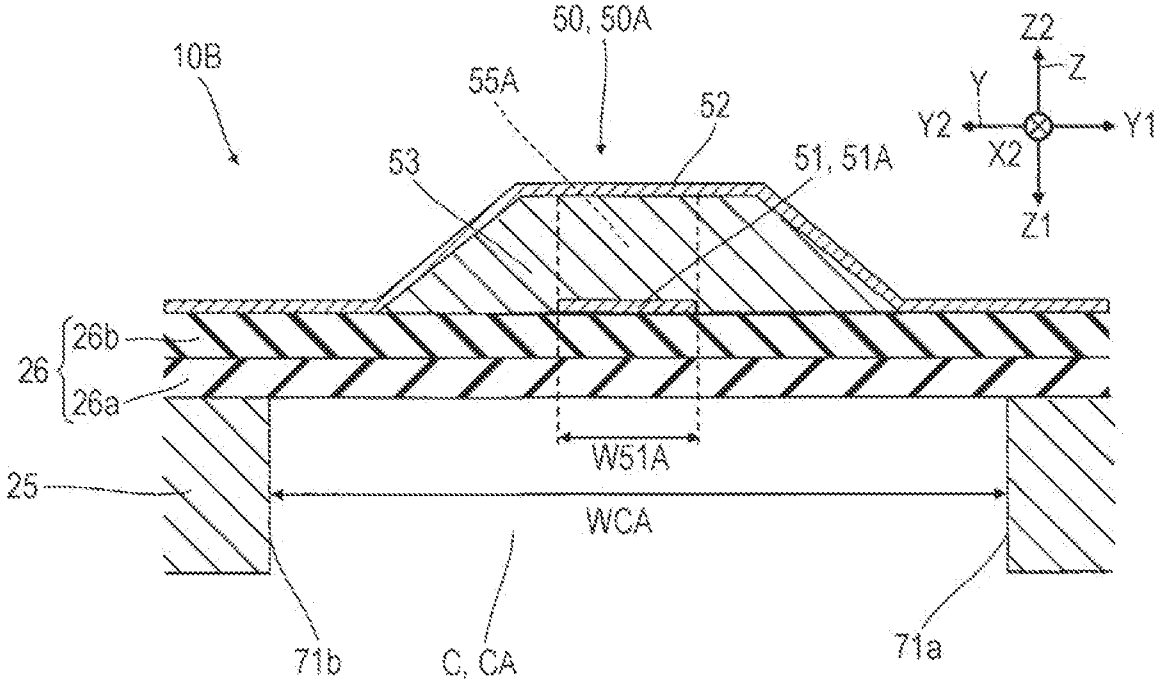
FIG. 15 is a cross sectional view illustrating the piezoelectric element on the line A side of the liquid discharging head.
Figure 16:
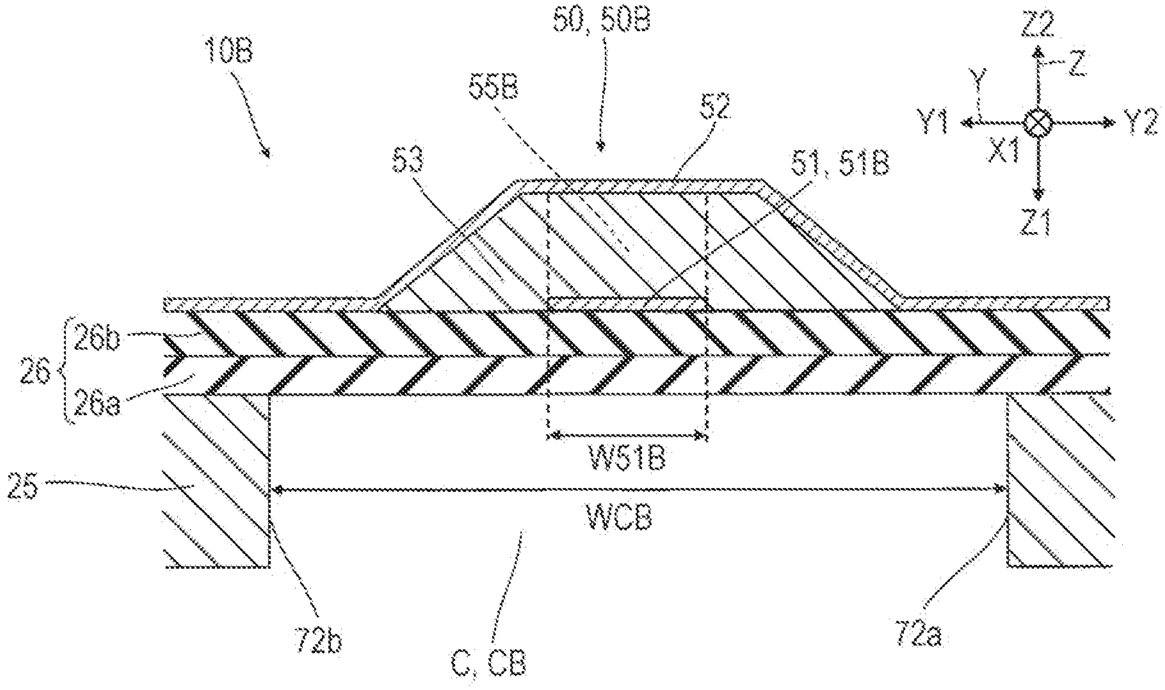
FIG. 16 is a cross sectional view illustrating the piezoelectric element on the line B side of the liquid discharging head.

Next, with reference to FIGS. 14 to 16, a liquid discharging head 10B according to a second embodiment will be described. FIG. 14 is a plan view illustrating electrodes 51A and 51B of the piezoelectric elements 50A and 50B of the liquid discharging head 10B according to the second embodiment. FIG. 15 is a cross sectional view illustrating the piezoelectric element 50A of the liquid discharging head 10B. FIG. 16 is a cross sectional view illustrating the piezoelectric element 50B of the liquid discharging head 10B. FIGS. 15 and 16 illustrate cross sections of the piezoelectric elements 50A and 50B along the Y-Z plane. The liquid discharging head 10B according to the second embodiment is different from the liquid discharging head 10 according to the first embodiment in that a width W51A of the electrode 51A of the piezoelectric element 50A is different from a width W51B of the electrode 51B of the piezoelectric element 50B, and the width WCA of the pressure chamber CA and the width WCB of the pressure chamber CB are the same. The width W51A of the electrode 51A is one example of a first discharging element. The width W51B of the electrode 51B is one example of a second discharging element. Note that in the description of the second embodiment, the same description as the description of the first embodiment will be omitted.

The liquid discharging head 10B includes the piezoelectric element 50A on the line A side and the piezoelectric element 50B on the line B side. The piezoelectric element 50A has the electrodes 51A and 52, and the piezoelectric laminate 53. The piezoelectric element 50B has the electrodes 51B and 52, and the piezoelectric laminate 53. The width W51B of the electrode 51B in the Y-axis direction is wider than the width W51A of the electrode 51A in the Y-axis direction. For example, the width W51B may be approximately 101% to 110% of the width W51A.

In the liquid discharging head 10B, the width W51B of the electrode 51B on the line B side is wider than the width W51A of the electrode 51A on the line A side. In other words, a driving region 55B of the piezoelectric laminate 53 between the electrode 51B and the electrode 52 is larger than a driving region 55A of the piezoelectric laminate 53 between the electrode 51A and the electrode 52. The displacement amount of the vibration plate 26 driven by the piezoelectric element 50B is larger than the displacement amount of the vibration plate 26 driven by the piezoelectric element 50A.

In the liquid discharging head 10B, the width W51B of the electrode 51B on the line B side is made wider than the width W51A of the electrode 51A on the line A side, as a result of which variation between the liquid discharging characteristics by the piezoelectric element 50A on the line A side and the liquid discharging characteristics by the piezoelectric element 50B on the line B side can be suppressed. In the liquid discharging head 10B, without changing the resonance frequency of the discharging unit on the line A side and the resonance frequency of the discharging unit on the line B side, variation between the discharging characteristics on the line A side and the discharging characteristics on the line B side can be suppressed.

Note that in the liquid discharging head 10B, it is described that the widths WCA and WCB of the pressure chambers CA and CB are the same, but the widths WCA and WCB may be different from each other. For example, as with the liquid discharging head 10 of the first embodiment, the width WCB of the pressure chamber CB may be larger than the width WCA of the pressure chamber CA.

Figure 18:
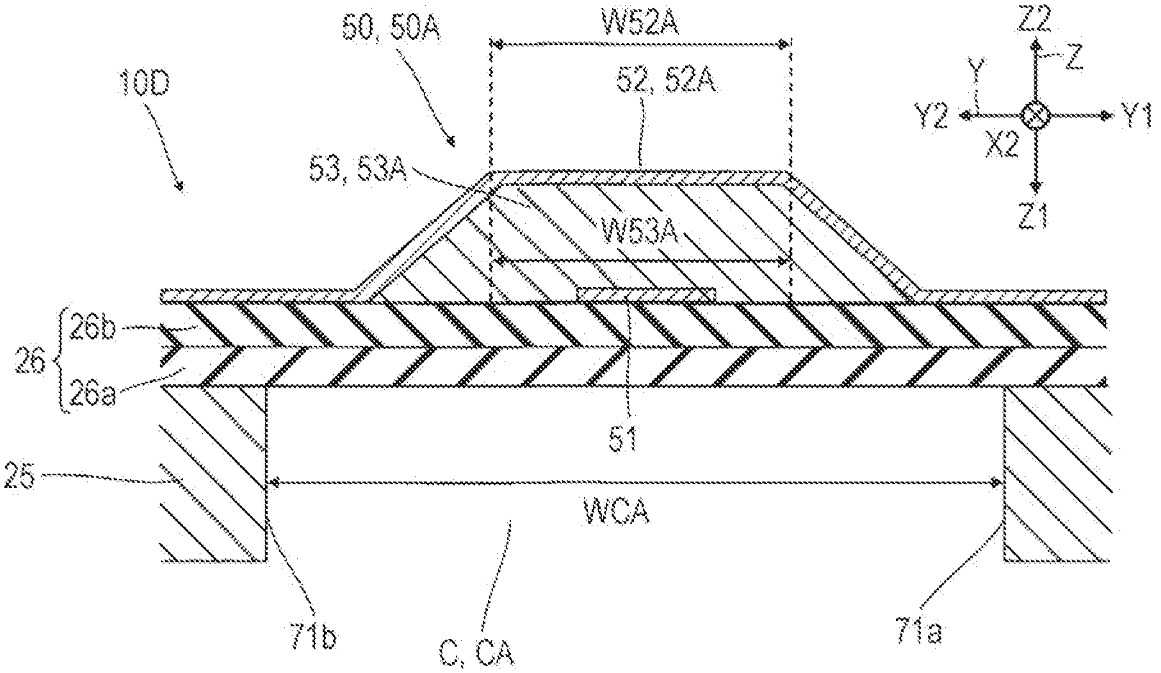
FIG. 18 is a cross sectional view illustrating the piezoelectric element on the line A side of the liquid discharging head.
Figure 19:
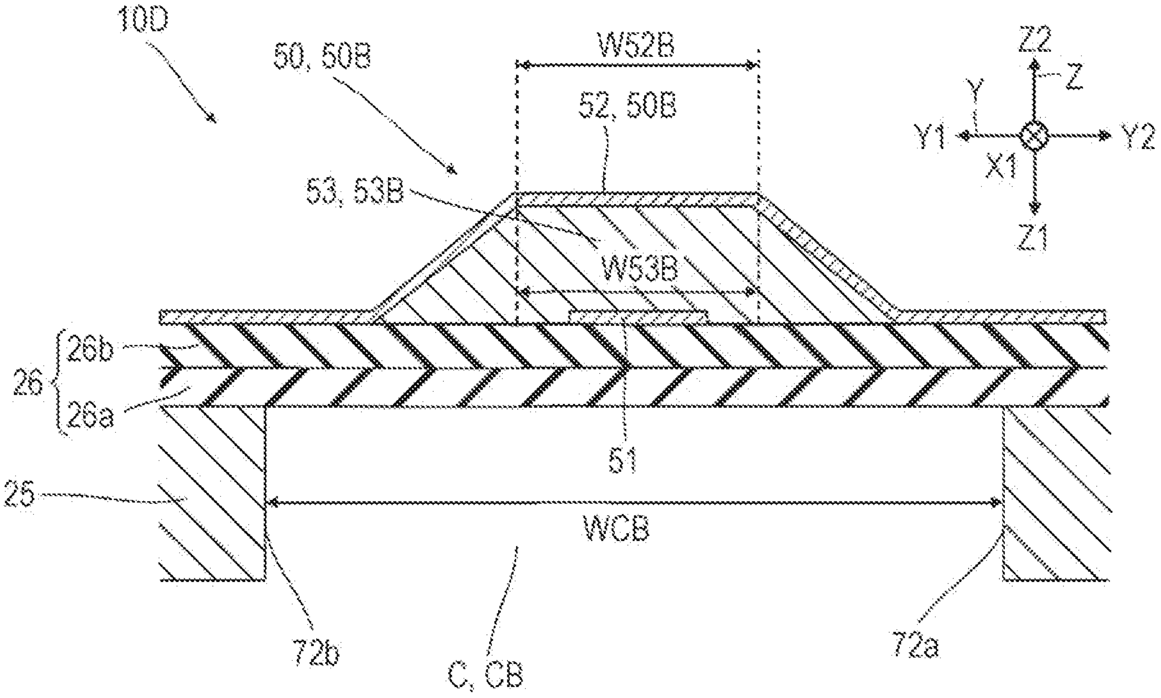
FIG. 19 is a cross sectional view illustrating the piezoelectric element on the line B side of the liquid discharging head.

Next, with reference to FIGS. 17 to 19, a liquid discharging head 10C according to a third embodiment will be described. FIG. 17 is a plan view illustrating electrodes 52A and 52B of the piezoelectric elements 50A and 50B of the liquid discharging head 10C according to the third embodiment. FIG. 18 is a cross sectional view illustrating the piezoelectric element 50A of the liquid discharging head 10C. FIG. 19 is a cross sectional view illustrating the piezoelectric element 50B of the liquid discharging head 10C. FIGS. 18 and 19 illustrate cross sections of the piezoelectric elements 50A and 50B along the Y-Z plane. The liquid discharging head 10C according to the third embodiment is different from the liquid discharging head 10 according to the first embodiment in that a width W52A of the electrode 52A of the piezoelectric element 50A is different from a width W52B of the electrode 52B of the piezoelectric element 50B, a width W53A of a piezoelectric laminate 53A of the piezoelectric element 50A is different from a width W53B of a piezoelectric laminate 53B of the piezoelectric element 50B, and the WCA of the pressure chamber CA and the width WCB of the pressure chamber CB are the same. The width W52A of the electrode 52A is one example of the first discharging element. The width W52B of the electrode 52B is one example of the second discharging element. The width W53A of the piezoelectric laminate 53A is one example of the first discharging element. The width W53B of the piezoelectric laminate 53B is one example of the second discharging element. Note that in the description of the third embodiment, the same description as the description of the above-described embodiments will be omitted.

The liquid discharging head 10C includes the piezoelectric element 50A on the line A side and the piezoelectric element 50B on the line B side. The piezoelectric element 50A has the electrodes 51 and 52A, and the piezoelectric laminate 53A. The piezoelectric element 50B has the electrodes 51 and 52B, and the piezoelectric laminate 53B. The width W52A of the electrode 52A in the Y-axis direction is wider than the width W52B of the electrode 52B in the Y-axis direction. The width W52B is shorter than the width W52A. For example, the width W52A may be approximately 101% to 110% of the width W52B. The width W52A of the electrode 52A, for example, has a length of a portion separated from the vibration plate 26 in the Z2 direction and parallel to the X-Y plane in the Y-axis direction. The width W52B of the electrode 52B, for example, has a length of a portion separated from the vibration plate 26 in the Z2 direction and parallel to the X-Y plane in the Y-axis direction.

In the liquid discharging head 10C, the width W52A of the electrode 52A on the line A side is wider than the width W52B of the electrode 52B on the line B side. The electrode 52A and 52B are formed, for example, on the piezoelectric laminates 53A and 53B by film formation. The widths W52A and W52B of the electrodes 52A and 52B can be highly accurately formed by film formation.

In the liquid discharging head 10C, by making the width W52A of the electrode 52A on the line A side wider than the width W52B of the electrode 52B on the line B side, the resonance frequency of the discharging unit on the line A side can be increased. As a result, variation between the discharging characteristics of the discharging unit on the line A side and the discharging characteristics of the discharging unit on the line B side can be suppressed. The widths W52A and W52B of the electrode 52A and 52B can be highly accurately formed compared to the width WCA and WCB of the pressure chambers CA and CB. As a result, in the liquid discharging head 10C, by adjusting the widths W52A and W52B of the electrode 52A and 52B, the resonance frequency can be highly accurately adjusted.

In the liquid discharging head 10C, the width W53A, in the Y-axis direction, of the piezoelectric laminate 53A on the line A side is wider than the width W53B, in the Y-axis direction, of the piezoelectric laminate 53B on the line B side. The width W53B is shorter than the width W53A. For example, the width W53A may be approximately 101% to 110% of the width W53B. As a result, according to the size of the widths W53A and W53B of the piezoelectric laminates 53A and 53B, the electrodes 52A and 52B can be formed on the piezoelectric laminates 53A and 53B. Note that the width W53A of the piezoelectric laminate 53A is a width, in the Y-axis direction, of a surface of the piezoelectric laminate 53A, on which the electrode 52A is formed. In addition, in the liquid discharging head 10C, the volume of the piezoelectric laminate 53A on the line A side can be made larger than the volume of the piezoelectric laminate 53B on the line B side. In this manner, by making the piezoelectric laminates 53A and 53B different from each other, the resonance frequency may be adjusted.

Note that in the liquid discharging head 10C, it is described that the widths WCA and WCB of the pressure chambers CA and CB are the same, but the widths WCA and WCB may be different from each other. For example, as with the liquid discharging head 10 of the first embodiment, the width WCB of the pressure chamber CB may be larger than the width WCA of the pressure chamber CA. In addition, in the liquid discharging head 10C, as with the liquid discharging head 10B in the above-described embodiment, the widths W51A and W51B of the electrodes 51A and 51B may be changed.

Figure 20:
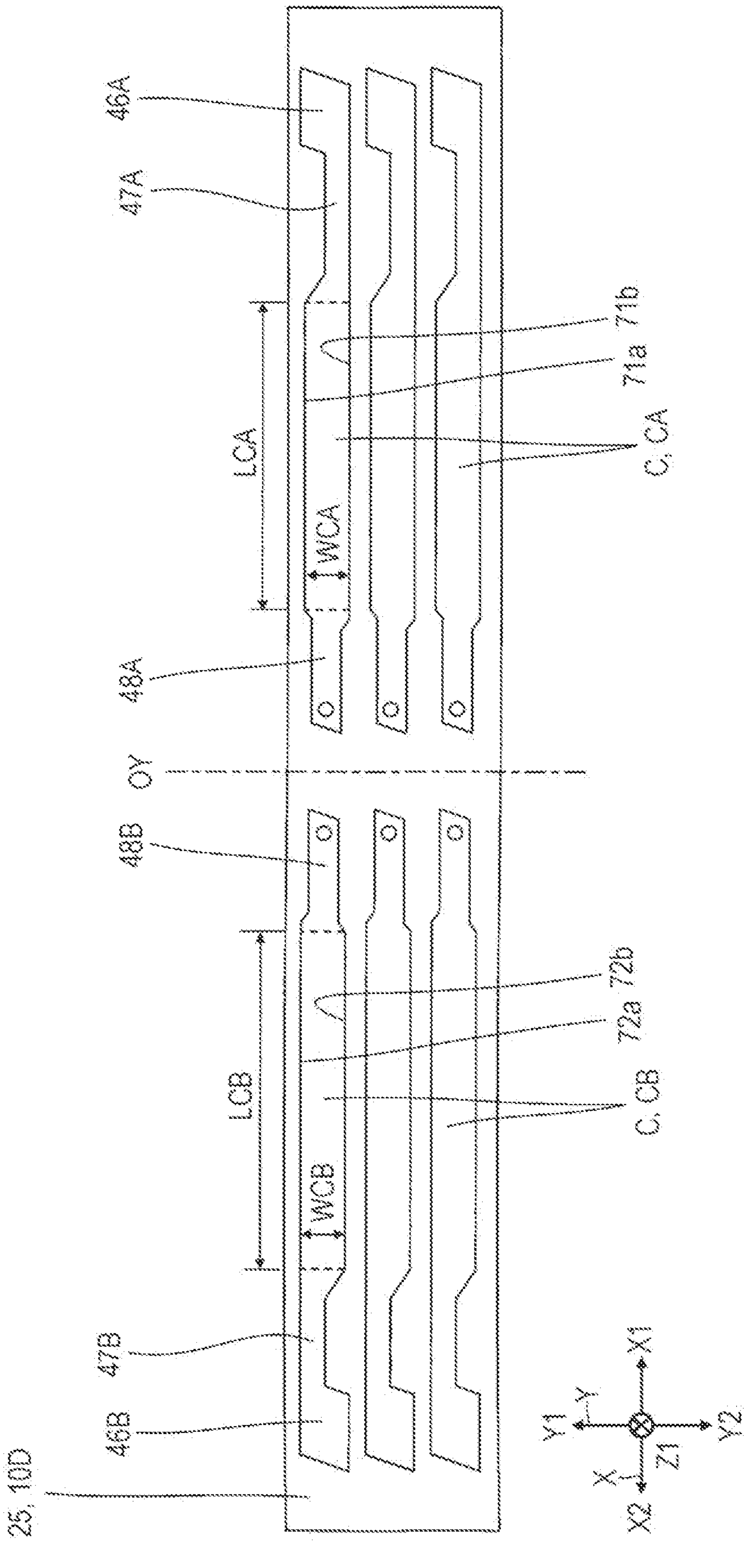
FIG. 20 is a plan view illustrating a portion of a pressure chamber substrate on which a pressure chamber of a liquid discharging head according to a fourth embodiment is formed.
Figure 21:
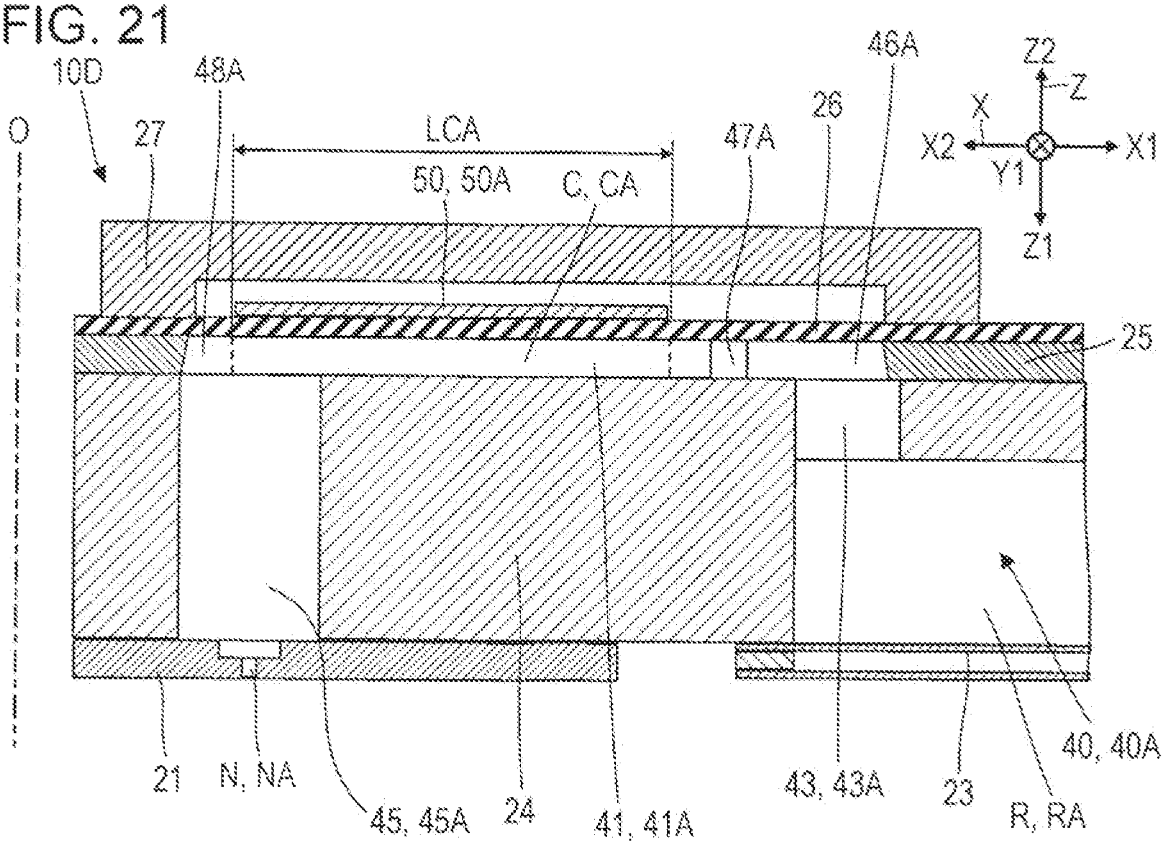
FIG. 21 is a cross sectional view illustrating the pressure chamber and the piezoelectric element on the line A side.
Figure 22:
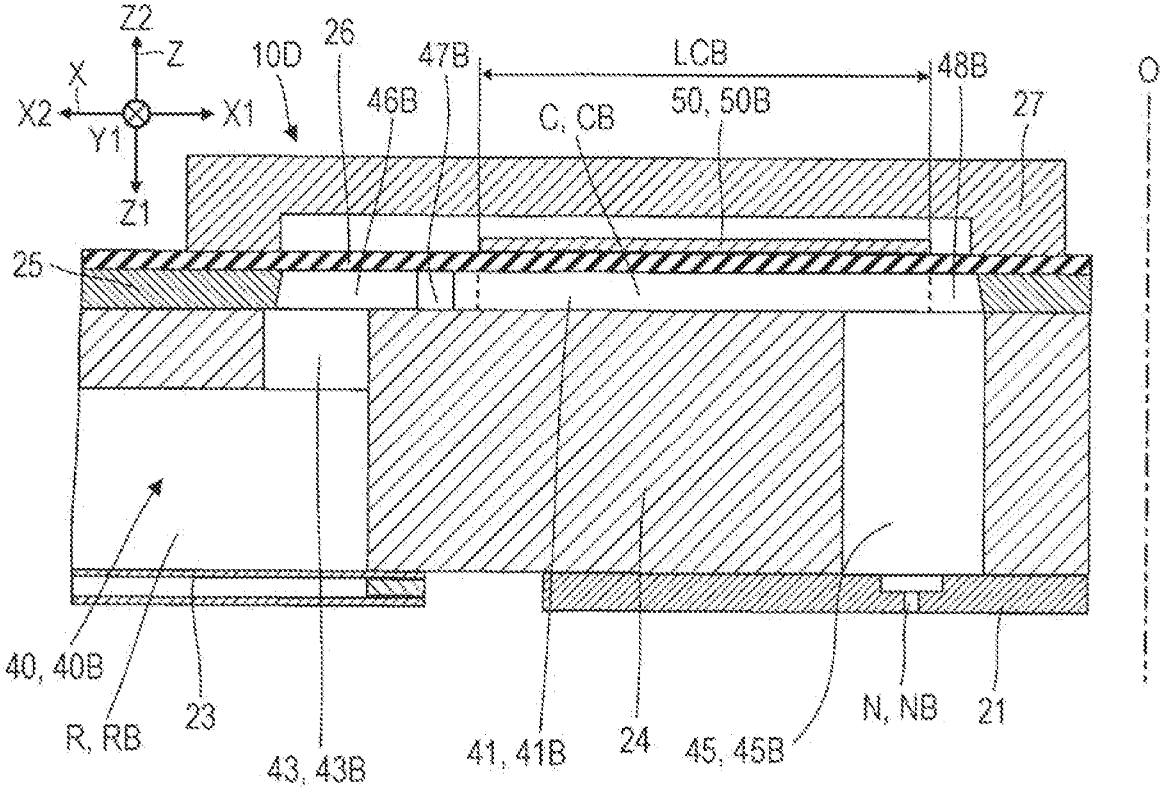
FIG. 22 is a cross sectional view illustrating the pressure chamber and the piezoelectric element on the line B side.

Next, with reference to FIGS. 20 to 22, a liquid discharging head 10D according to a fourth embodiment will be described. FIG. 20 is a plan view illustrating the pressure chambers CA and CB of the liquid discharging head 10D according to the fourth embodiment. FIG. 20 illustrates a portion of the pressure chamber substrate 25 on which the pressure chambers CA and CB are formed. FIG. 21 is a cross sectional view illustrating the pressure chamber CA and the piezoelectric element 50A on the line A side. FIG. 22 is a cross sectional view illustrating the pressure chamber CB and the piezoelectric element 50B on the line B side. The liquid discharging head 10D according to the fourth embodiment is different from the liquid discharging head 10 according to the first embodiment in that a length LCA of the pressure chamber CA is different from a length LCB of the pressure chamber CB, and the width WCA of the pressure chamber CA and the width WCB of the pressure chamber CB are the same. The length LCA of the pressure chamber CA is one example of the first discharging element. The length LCB of the pressure chamber CB is one example of the second discharging element. Note that in the description of the fourth embodiment, the same description as the description of the above-described embodiments will be omitted.

The liquid discharging head 10D includes the pressure chamber substrate 25 on which the pressure chambers CA and CB are formed. The length LCB, in the X-axis direction, of the pressure chamber CB on the line B side is longer than the length LCA, in the X-axis direction, of the pressure chamber CA on the line A side. For example, the length LCB may be approximately 101% to 110% of the length LCA. The length of the pressure chamber CA may be, for example, a length of a portion of the wall surface 71*a* and the wall surface 71*b* extending in the X-axis direction. The length of the pressure chamber CA may be a distance between the supply port 47A and the communicating chamber 48A. The length of the pressure chamber CB may be, for example, a portion of the wall surface 72*a* and the wall surface 72*b* extending in the X-axis direction. The length of the pressure chamber CB may be a distance between the supply port 47B and the communicating chamber 48B.

In the liquid discharging head 10D, the length LCB of the pressure chamber CB on the line B side is longer than the length LCA of the pressure chamber CA on the line A side. As a result, the volume of the pressure chamber CB is larger than the volume of the pressure chamber CA. The amount of liquid that can be stored in the pressure chamber CB is larger than the amount of liquid that can be stored in the pressure chamber CA. The length of the driving region of the piezoelectric laminate 53 of the piezoelectric element 50B on the line B side may be longer than the length of the driving region of the piezoelectric laminate 53 of the piezoelectric element 50A on the line A side.

In the liquid discharging head 10D described above, the length of the driving region of the piezoelectric element 50B is made longer than the length of the driving region of the piezoelectric element 50A so that the removal displacement of liquid by the vibration plate 26 constituting a wall surface of the pressure chamber CB can be made greater than the removal displacement of liquid by the vibration plate 26 constituting a wall surface of the pressure chamber CA. In the liquid discharging head 10D, by making the length LCB of the pressure chamber CB longer than the length LCA of the pressure chamber CA, variation between the liquid discharging characteristics by the piezoelectric element 50A on the line A side and the liquid discharging characteristics by the piezoelectric element 50B on the line B side can be suppressed. In the liquid discharging head 10D, without changing the resonance frequency of the discharging unit on the line A side and the resonance frequency of the discharging unit on the line B side, variation between the discharging characteristics on the line A side and the discharging characteristics on the line B side can be suppressed.

Note that in the liquid discharging head 10D, it is described that the widths WCA and WCB of the pressure chambers CA and CB are the same, but the widths WCA and WCB may be different from each other. For example, as with the liquid discharging head 10 of the first embodiment, the width WCB of the pressure chamber CB may be larger than the width WCA of the pressure chamber CA. In addition, in the liquid discharging head 10D, as with the liquid discharging heads 10B and 10C in the above-described embodiments, the widths W51A and W51B of the electrodes 51A and 51B may be changed, and the widths W52A and W52B of the electrodes 52A and 52B may be changed.

Figure 23:
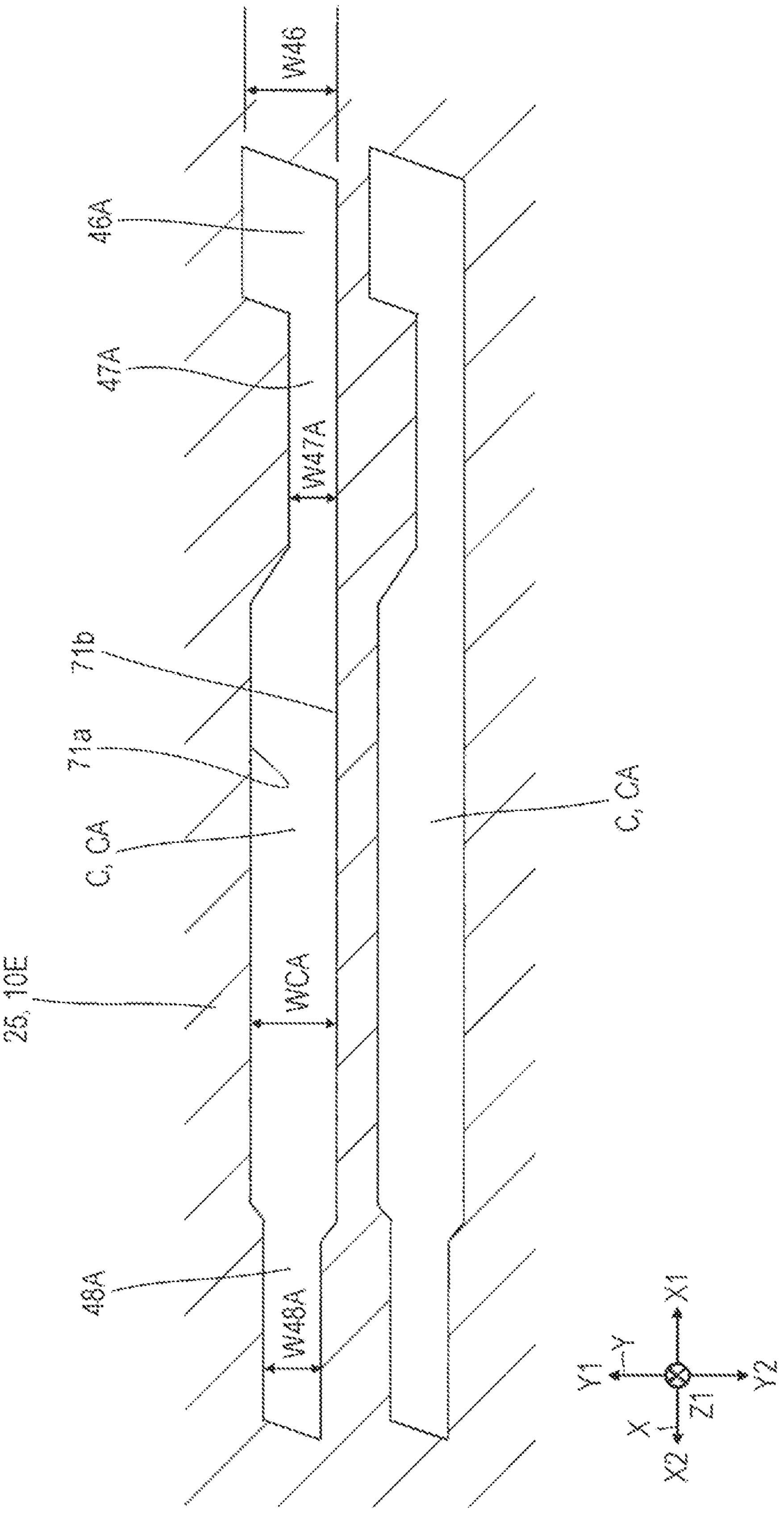
FIG. 23 is a cross sectional view illustrating a pressure chamber substrate on which a pressure chamber of a liquid discharging head according to a fifth embodiment is formed.
Figure 24:
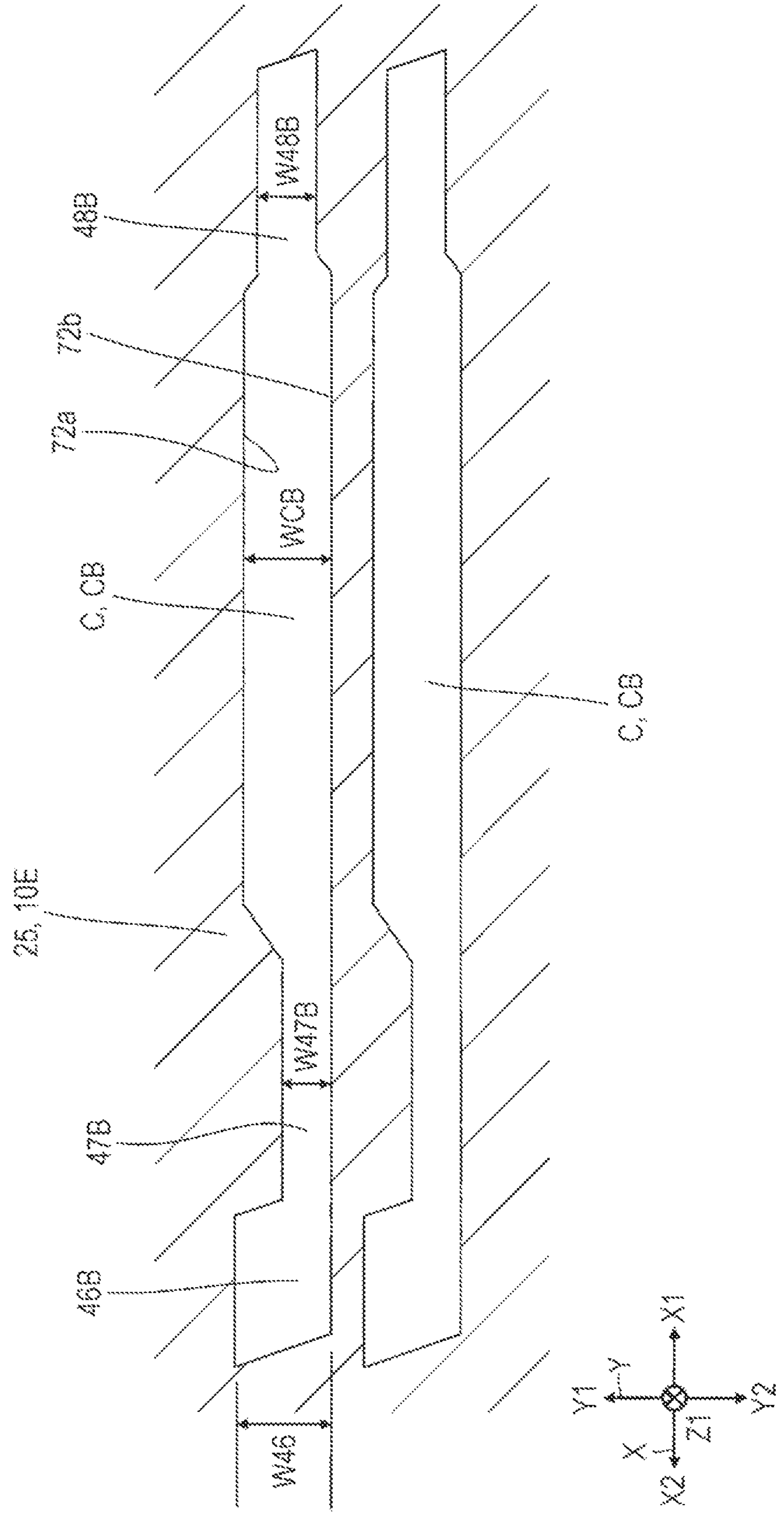
FIG. 24 is a cross sectional view illustrating the pressure chamber substrate on which a pressure chamber of the liquid discharging head according to the fifth embodiment is formed.
Figure 25:
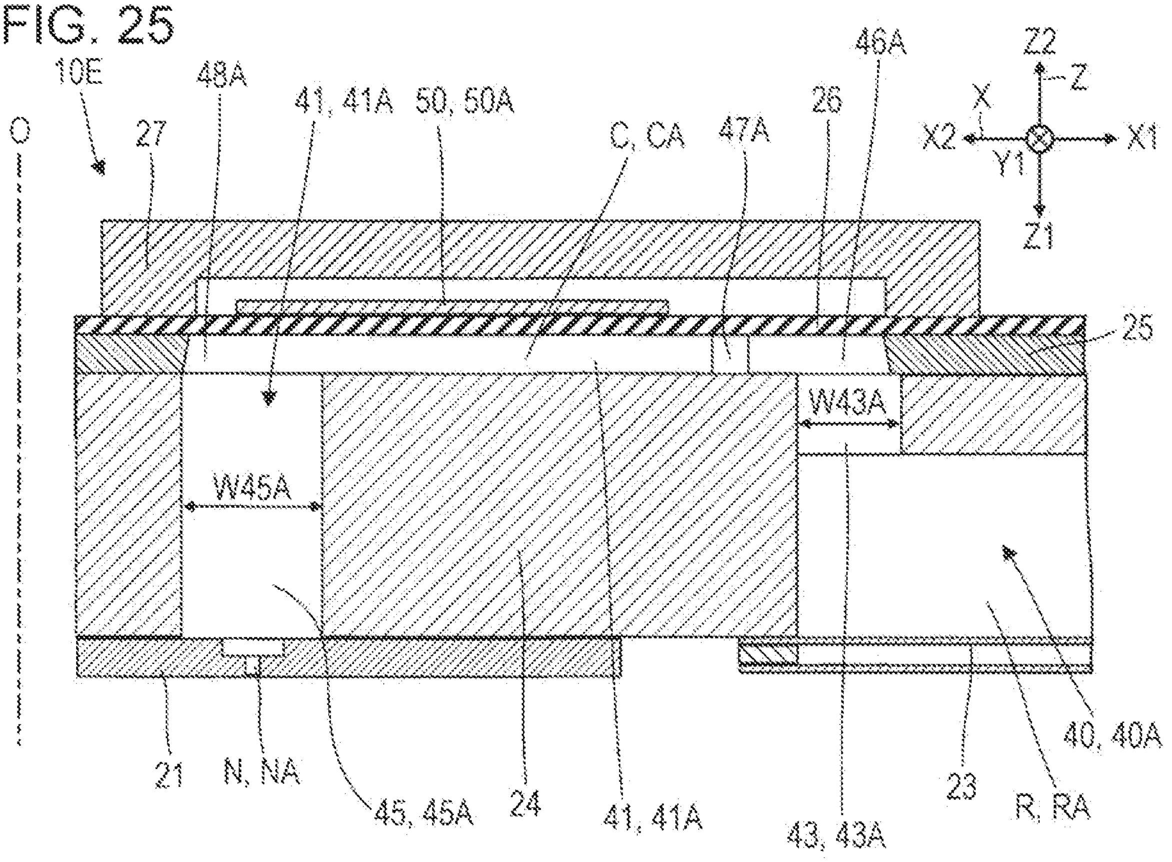
FIG. 25 is a cross sectional view illustrating the pressure chamber and the piezoelectric element on the line A side.
Figure 26:
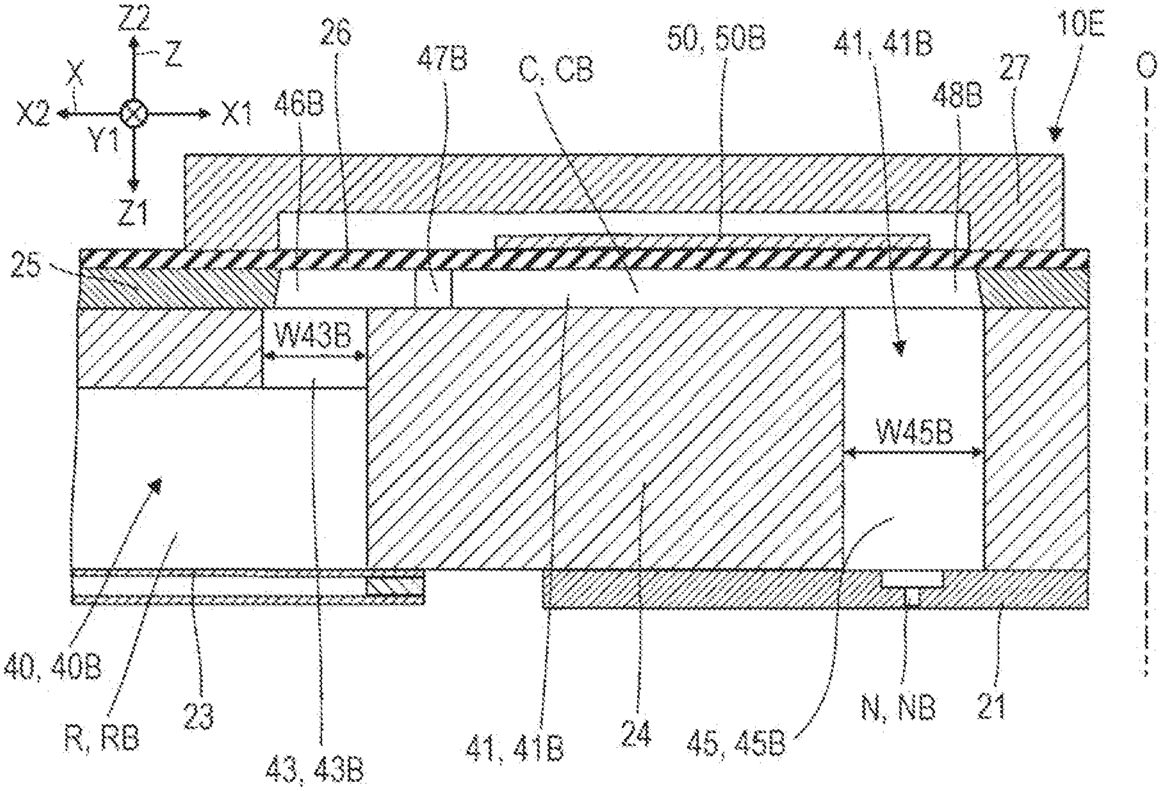
FIG. 26 is a cross sectional view illustrating the pressure chamber and the piezoelectric element on the line B side.
Figure 27:
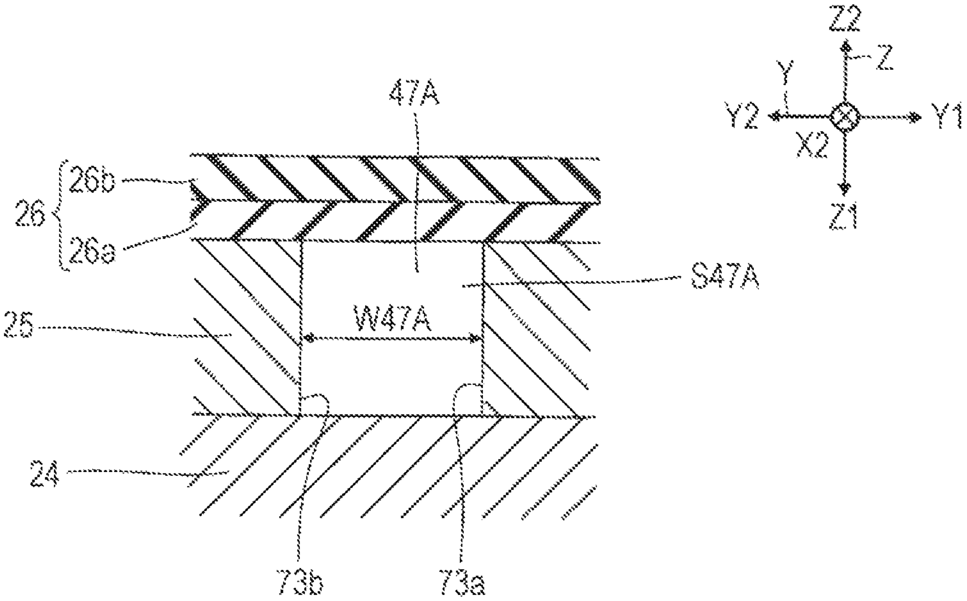
FIG. 27 is a cross sectional view illustrating a supply port on the line A side.
Figure 28:
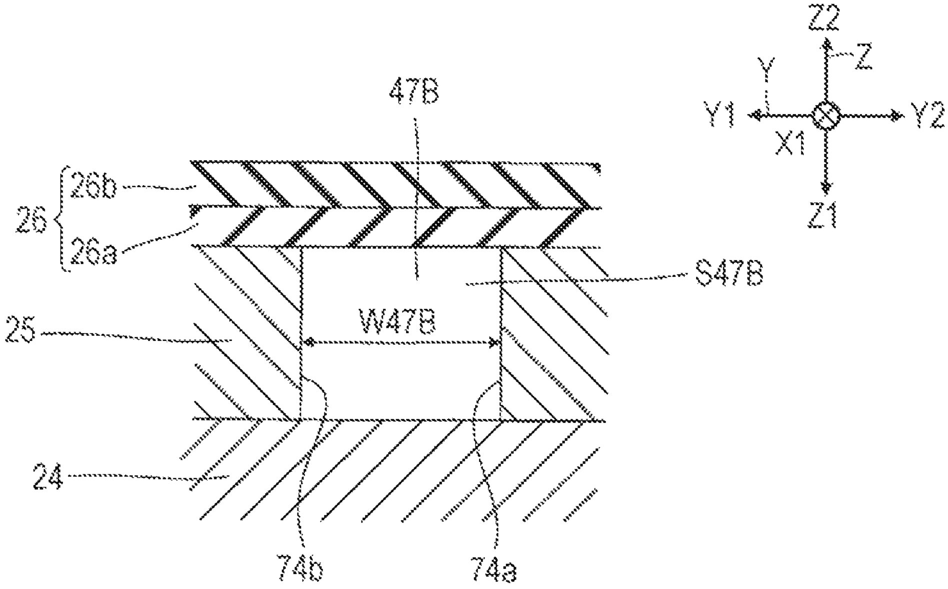
FIG. 28 is a cross sectional view illustrating a supply port on the line B side.

Next, with reference to FIGS. 23 to 28, a liquid discharging head 10E according to a fifth embodiment will be described. FIG. 23 is a cross sectional view illustrating the pressure chamber substrate 25 on which the pressure chamber CA of the liquid discharging head 10E according to the fifth embodiment is formed. FIG. 24 is a cross sectional view illustrating the pressure chamber substrate 25 on which the pressure chamber CB of the liquid discharging head 10E according to the fifth embodiment is formed. FIG. 25 is a cross sectional view illustrating the pressure chamber CA and the piezoelectric element 50A on the line A side. FIG. 26 is a cross sectional view illustrating the pressure chamber CB and the piezoelectric element 50B on the line B side. FIG. 27 is a cross sectional view illustrating the supply port 47A on the line A side. FIG. 28 is a cross sectional view illustrating the supply port 47B on the line B side.

The liquid discharging head 10E according to the fifth embodiment is different from the liquid discharging head 10 according to the first embodiment in that a width W47A of the supply port 47A is different form a width W47B of the supply port 47B, a width W48A of the communicating chamber 48A is different from a width W48B of the communicating chamber 48B, a width W43A of the relay passage 43A is different from a width W43B of the relay passage 43B, a width W45A of the communicating passage 45A is different from a width W45B of the communicating passage 45B, and the width WCA of the pressure chamber CA and the width WCB of the pressure chamber CB are the same.

The width W47A of the supply port 47A is one example of the first discharging element. The width W47B of the supply port 47B is one example of the second discharging element. The width W48A of the communicating chamber 48A is one example of the first discharging element. The width W48B of the communicating chamber 48B is one example of the second discharging element. The width W43A of the relay passage 43A is one example of the first discharging element. The width W43B of the relay passage 43B is one example of the second discharging element. The width W45A of the communicating passage 45A is one example of the first discharging element. The width W45B of the communicating passage 45B is one example of the second discharging element. Note that in the description of the fifth embodiment, the same description as the description of the above-described embodiments will be omitted.

As illustrated in FIGS. 23 and 25, on the pressure chamber substrate 25 of the liquid discharging head 10E, the pressure chamber CA, the relay chamber 46A, the supply port 47A, and the communicating chamber 48A are formed. As illustrated in FIGS. 24 and 26, the pressure chamber CB, the relay chamber 46B, the supply port 47B, and the communicating chamber 48B are formed. FIG. 27 illustrates a cross section of the supply port 47A along the Y-Z plane, and FIG. 28 illustrates a cross section of the supply port 47B along the Y-Z plane. The width W47B, which is a length of the supply port 47B in the Y-axis direction, is wider than the width W47A, which is a length of the supply port 47A in the Y-axis direction. In other words, a cross sectional area S47B of the supply port 47B is larger than a cross sectional area S47A of the supply port 47A. The cross sectional area S47A of the supply port 47A is one example of the minimum cross sectional area of the first passage. The cross sectional area S47B of the supply port 47B is one example of the minimum cross sectional area of the second passage.

The width W47A of the supply port 47A illustrated in FIG. 27 is a distance between a wall surface 73*a* and a wall surface 73*b* mutually separated in the Y-axis direction. The width W47B of the supply port 47B illustrated in FIG. 28 is a distance between a wall surface 74*a* and a wall surface 74*b* mutually separated in the Y-axis direction. Since the thickness of the pressure chamber substrate 25 in the Z-axis direction is the same in the X-axis direction, the cross sectional area S47B of the supply port 47B is larger than the cross sectional area S47A of the supply port 47A.

The width W48B, which is a length of the communicating chamber 48B in the Y-axis direction, illustrated in FIG. 24, is wider than the width W48A, which is a length of the communicating chamber 48A in the Y-axis direction, illustrated in FIG. 23. In other words, the cross sectional area of the cross section of the communicating chamber 48B along the Y-Z plane is larger than the cross sectional area of the cross section of the communicating chamber 48A along the Y-Z plane.

The width W43B, which is a length of the relay passage 43B in the X-axis direction, illustrated in FIG. 26 is wider than the width W43A, which is a length of the relay passage 43A in the X-axis direction, illustrated in FIG. 25. In other words, the cross sectional area of the cross section of the relay passage 43B along the X-Y plane is larger than the cross sectional area of the cross section of the relay passage 43A along the X-Y plane.

The width W45B, which is a length of the communicating passage 45B in the X-axis direction, is wider than the width W45A, which is a length of the communicating passage 45A in the X-axis direction. In other words, the cross sectional area of the cross section of the communicating passage 45B along the X-Y plane is larger than the cross sectional area of the cross section of the communicating passage 45A along the X-Y plane.

In the liquid discharging head 10E described above, since the cross sectional area of the passage of the individual passage 41B on the line B side is larger than the cross sectional area of the passage of the individual passage 41A on the line A side, the discharging amount of liquid discharged from the nozzle NB on the line B side can be made larger than the discharging amount of liquid discharged from the nozzle NA on the line A side. In the liquid discharging head 10E, variation between the liquid discharging characteristics by the piezoelectric element 50A on the line A side and the liquid discharging characteristics by the piezoelectric element 50B on the line B side can be suppressed. In the liquid discharging head 10E, without changing the resonance frequency of the discharging unit on the line A side and the resonance frequency of the discharging unit on the line B side, variation between the discharging characteristics on the line A side and the discharging characteristics on the line B side can be suppressed.

Note that in the liquid discharging head 10E, it is described that the widths WCA and WCB of the pressure chambers CA and CB are the same, but the widths WCA and WCB may be different from each other. For example, as with the liquid discharging head 10 of the first embodiment, the width WCB of the pressure chamber CB may be larger than the width WCA of the pressure chamber CA. In addition, in the liquid discharging head 10E, as with the liquid discharging heads 10B, 10C, and 10D in the above-described embodiments, the widths W51A and W51B of the electrodes 51A and 51B may be changed, the widths W52A and W52B of the electrodes 52A and 52B may be changed, and the lengths LCA and LCB of the electrodes 51A and 51B may be changed.

Figure 29:
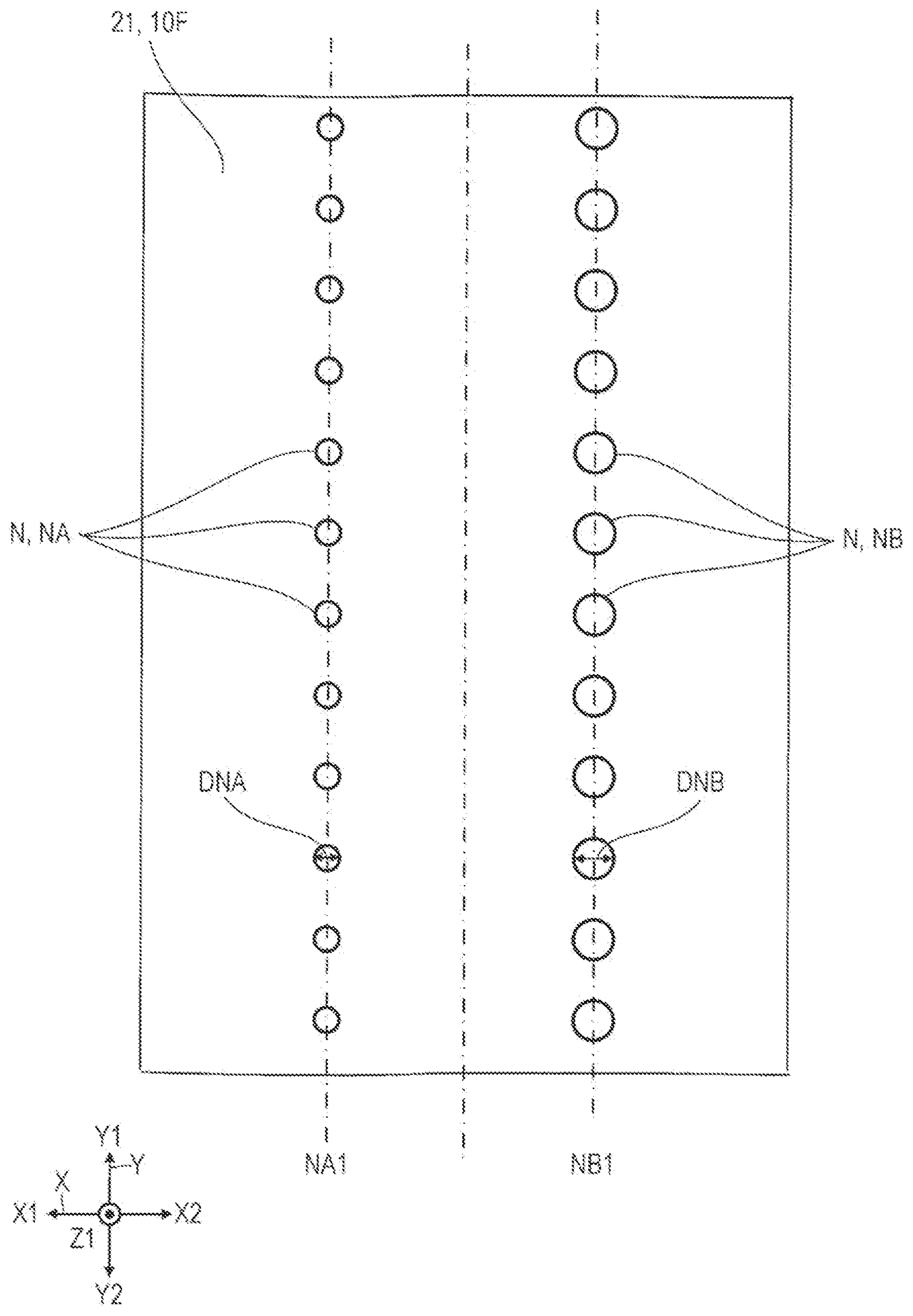
FIG. 29 is a bottom view illustrating a nozzle plate of a liquid discharging head according to a sixth embodiment.

Next, with reference to FIG. 29, a liquid discharging head 10F according to a sixth embodiment will be described. FIG. 29 is a bottom view illustrating the nozzle plate 21 of the liquid discharging head 10F according to the sixth embodiment. The liquid discharging head 10F according to the sixth embodiment is different from the liquid discharging head 10 according to the first embodiment in that a diameter DNA of the nozzle NA on the line A side is different from a diameter DNB of the nozzle NB on the line B side, and the width WCA of the pressure chamber CA and the width WCB of the pressure chamber CB are the same. The diameter DNA of the nozzle NA is one example of the first discharging element. The diameter DNB of the nozzle NB is one example of the second discharging element. Note that in the description of the sixth embodiment, the same description as the description of the above-described embodiments will be omitted.

The liquid discharging head 10F includes the nozzle plate 21 on which the nozzles NA and NB are formed. The diameter DNB of the nozzle NB on the line B side is larger than the diameter DNA of the nozzle NA on the line A side. The area of the opening of the nozzle NB on the line B side is larger than the area of the opening of the nozzle NA on the line A side.

In the liquid discharging head 10F described above, since the diameter DNB of the nozzle NB on the line B side is larger than the diameter DNA of the nozzle NA on the line A side, the discharging amount of liquid discharged from the nozzle NB on the line B side can be made larger than the discharging amount of liquid discharged from the nozzle NA on the line A side. In the liquid discharging head 10F, variation between the liquid discharging characteristics by the piezoelectric element 50A on the line A side and the liquid discharging characteristics by the piezoelectric element 50B on the line B side can be suppressed. In the liquid discharging head 10F, without changing the resonance frequency of the discharging unit on the line A side and the resonance frequency of the discharging unit on the line B side, variation between the discharging characteristics on the line A side and the discharging characteristics on the line B side can be suppressed.

Note that in the liquid discharging head 10F, it is described that the widths WCA and WCB of the pressure chambers CA and CB are the same, but the widths WCA and WCB may be different from each other. For example, as with the liquid discharging head 10 of the first embodiment, the width WCB of the pressure chamber CB may be larger than the width WCA of the pressure chamber CA. In addition, in the liquid discharging head 10F, as with the liquid discharging heads 10B, 10C, 10D, and 10E in the above-described embodiments, the widths W51A and W51B of the electrodes 51A and 51B may be changed, the widths W52A and W52B of the electrodes 52A and 52B may be changed, the lengths LCA and LCB of the electrodes 51A and 51B may be changed, and the cross sectional areas of the individual passages 41A and 41B may be changed.

Figure 30:
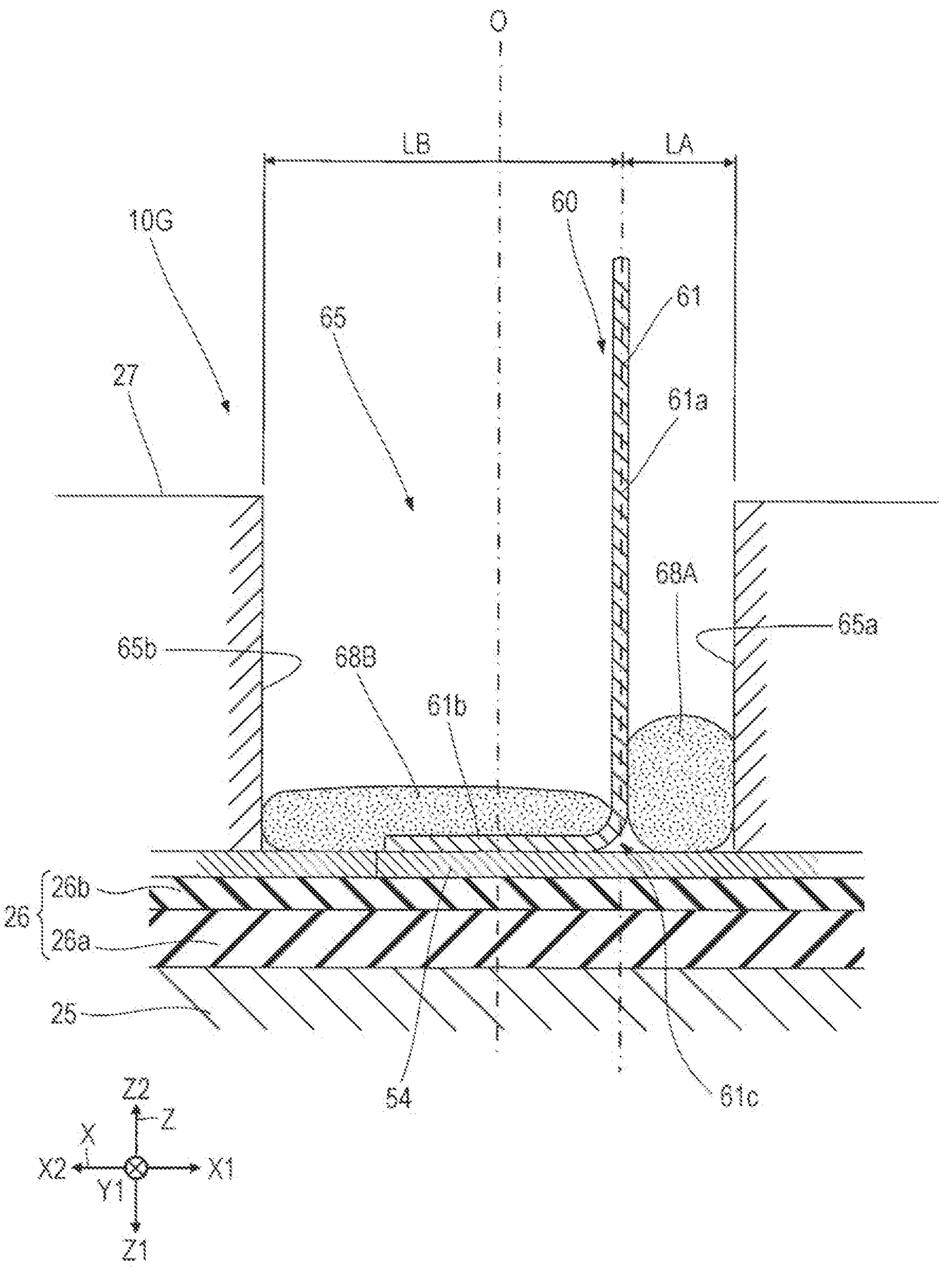
FIG. 30 is a cross sectional view illustrating a COF and an adhesive disposed in an opening of a sealing plate of a liquid discharging head according to a seventh embodiment.

Next, with reference to FIG. 30, the liquid discharging head 10G according to a seventh embodiment will be described. FIG. 30 is a cross sectional view illustrating the COF 60 and the adhesives 68A and 68B disposed in the opening 65 of the sealing plate 27 of the liquid discharging head 10G according to the seventh embodiment. The liquid discharging head 10G according to the seventh embodiment is different from the liquid discharging head 10 according to the first embodiment in that the volume of the adhesive 68A on the line A side and the volume of the adhesive 68B on the line B side are the same. Note that in the description of the seventh embodiment, the same description as the description of the above-described embodiments will be omitted.

The center of the opening 65 of the sealing plate 27 in the X-axis direction is disposed at a position overlapping the central line O of the liquid discharging head 10G in the X-axis direction. The opening 65 includes a space between the wall surface 65*a* and the wall surface 65*b*. The center of the opening 65 in the X-axis direction is located at a center between the wall surface 65*a* and the wall surface 65*b* mutually separated in the X-axis direction. The adhesive 68A on the line A side exists between the flexible wiring substrate 61 and the wall surface 65*a* in the X-axis direction. The adhesive 68B on the line B side exists between the flexible wiring substrate 61 and the wall surface 65*b* in the X-axis direction. In the cross section illustrated in FIG. 30, the cross sectional area of the adhesive 68A on the line A side is equal to the cross sectional area of the adhesive 68B on the line B side. Being equal includes the case of being substantially equal.

In the liquid discharging head 10G described above, by making the volume of the adhesive 68A on the line A side equal to the volume of the adhesive 68B on the line B side, variation between the liquid discharging characteristics by the piezoelectric element 50A on the line A side and the liquid discharging characteristics by the piezoelectric element 50B on the line B side can be suppressed.

For example, in a liquid discharging head according to the conventional technique, when an adhesive disposed so as to cover the coupling portion of the flexible wiring substrate 61 and the lead electrode 54 is cured and contracted, a difference may be generated in contraction of the adhesive disposed on each side of the flexible wiring substrate 61. In this case, the adhesive whose amount is larger may have a higher contraction amount than the adhesive whose amount is smaller. Accordingly, due to the difference in the contraction amount, stress of the vibration plate 26 may be generated. As a result, a difference may be generated between the liquid discharging characteristics by the piezoelectric element on the line A side and the liquid discharging characteristics by the piezoelectric element on the line B side.

In the liquid discharging head 10G of the present embodiment, since the volume of the adhesive 68A on the line A side can be made equal to the volume of the adhesive 68B on the line B side, the difference in contraction between the adhesives 68A and 68B can be reduced. As a result, in the liquid discharging head 10G, the stress left on the vibration plate 26 is reduced, and variation between the discharging characteristics on the line A side and the discharging characteristics on the line B side can be suppressed. Variation between the resonance frequency of the vibration plate 26 on the line A side and the resonance frequency of the vibration plate 26 on the line B side can be suppressed.

Figure 31:
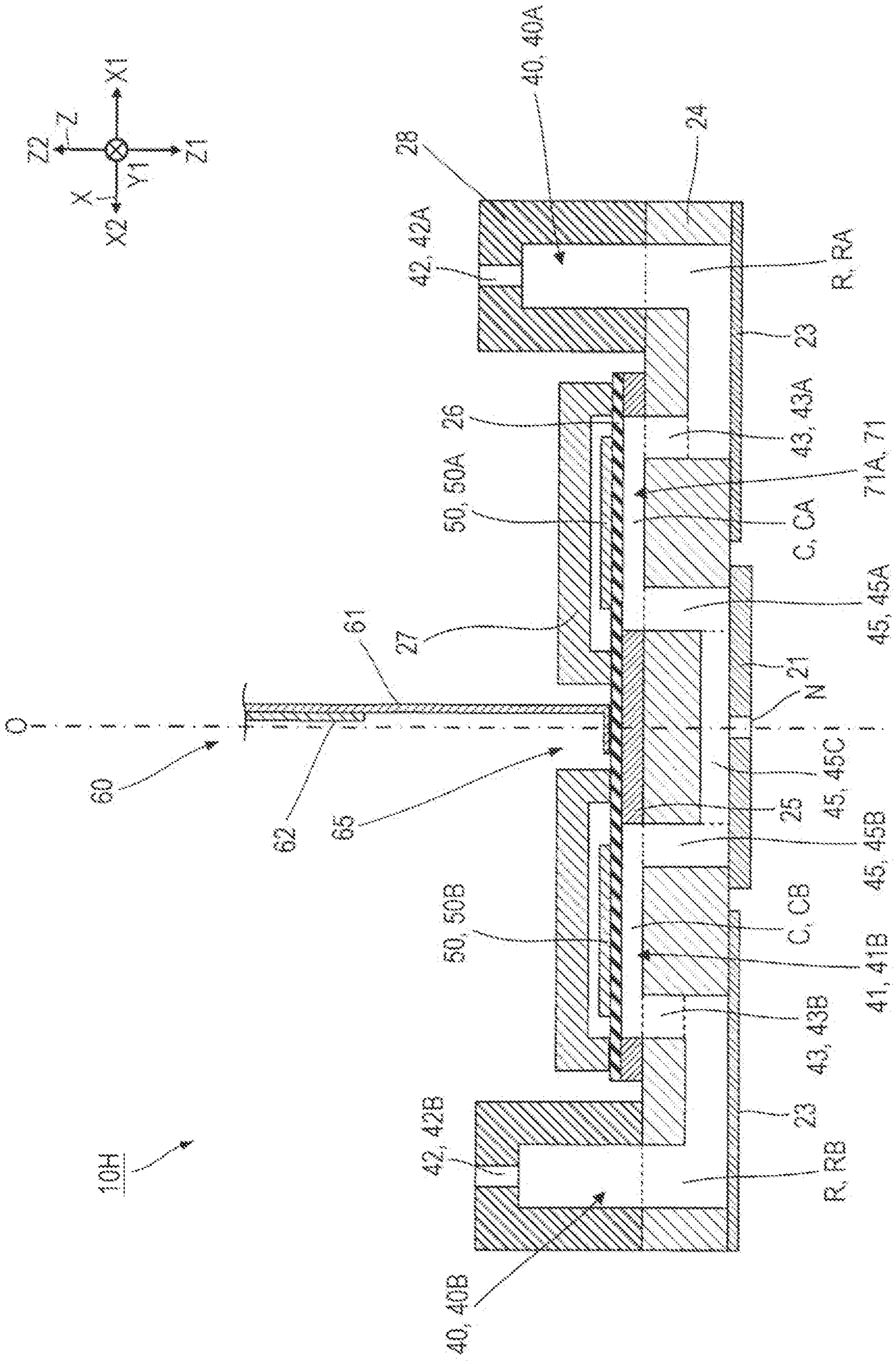
FIG. 31 is a cross sectional view illustrating a liquid discharging head according to an eighth embodiment.

Next, with reference to FIG. 31, the liquid discharging head 10H according to an eighth embodiment will be described. FIG. 31 is a cross sectional view illustrating the liquid discharging head 10H according to the eighth embodiment. The liquid discharging head 10H according to the eighth embodiment is different from the liquid discharging head 10 according to the first embodiment in that a nozzle N that communicates with both of the pressure chamber CA and the pressure chamber CB is included. Note that in the description of the eighth embodiment, the same description as the description of the above-described embodiments will be omitted.

In the liquid discharging head 10H, the common nozzle N that communicates with the pressure chamber CA on the line A side and the pressure chamber CB on the line B side is formed. In this manner, the nozzle N does not have to be separately formed on the line A side and the line B side. In the liquid discharging head 10H, variation between the liquid discharging characteristics by the piezoelectric element 50A on the line A side and the liquid discharging characteristics by the piezoelectric element 50B on the line B side can be suppressed.

In the liquid discharging head 10H of the eighth embodiment, as with the above-described liquid discharging heads 10B to 10E, a configuration in which other discharging elements such as the widths W51A and W51B of the electrodes 51A and 51B are different from each other may be adopted. In addition, in the liquid discharging head 10H, as with the liquid discharging head 10G, the volume of the adhesive 68A on the line A side may be equal to the volume of the adhesive 68B on the line B side.

Next, the liquid discharging head 10 according to a modification 1 will be described. In the liquid discharging head 10 according to the modification 1, the position of a wall surface that defines the opening 65 of the sealing plate 27 is different from that of the above-described liquid discharging head 10. For example, as illustrated in FIG. 12, in the liquid discharging head 10, in the X-axis direction, the distance between the wall surface **65*a* on the line A side and the central line O is equal to the distance between the wall surface 65*b* on the line B side and the central line O. In the liquid discharging head 10 according to the modification 1, the distance between the wall surface 65*a* on the line A side and the central line O is different from the distance between the wall surface 65*b* on the line B side and the central line O. For example, the distance between the wall surface 65*b* on the line B side and the central line O is shorter than the distance between the wall surface 65*a* on the line A side and the central line O. The position of the wall surface 65*b* of the liquid discharging head 10 according to the modification 1 may be disposed closer to the central line O than the position of the wall surface 65*b* of the liquid discharging head 10 according to the first embodiment illustrated in FIG. 12. In this manner, in the liquid discharging head 10 according to the modification 1, by making the distance between the wall surface 65*b* on the line B side and the central line O shorter than the distance between the wall surface 65*a* on the line A side and the central line O, the volume of the adhesive 68B on the line B may be reduced, compared to the liquid discharging head 10 of the first embodiment. By changing the volume of the adhesive 68B in this manner, variation between the liquid discharging performance by the piezoelectric element 50A on the line A side and the liquid discharging performance by the piezoelectric element 50**B on the line B side can be suppressed.

Next, the liquid discharging head 10 according to a modification 2 will be described. In the liquid discharging head 10 according to the modification 2, compared to the wall surface **65*a* of the liquid discharging head 10 according to the first embodiment illustrated in FIG. 12, the wall surface 65*a* on the line A side is disposed at a position away from the central line O. In this manner, the distance between the wall surface 65*a* on the line A side and the flexible wiring substrate 61 may be increased. By so doing, in the liquid discharging head 10 according to the modification 2, compared to the case of the liquid discharging head 10 of the first embodiment, by increasing the volume of the adhesive 68A on the line A side, variation between the liquid discharging performance by the piezoelectric element 50A on the line A side and the liquid discharging performance by the piezoelectric element 50**B on the line B side may be suppressed.

Next, the liquid discharging head 10 according to a modification 3 will be described. In the liquid discharging head 10 according to the modification 3, the width of an end portion of the opening 65 of the sealing plate 27 in the Y-axis direction is wider than the width of the central portion of the opening 65 in the Y-axis direction. Note that the width of the opening 65 is the width of the opening 65 in the X-axis direction. For example, in the first embodiment illustrated in FIG. 5, the width, of the opening 65 of the sealing plate 27, extending in the X-axis direction is the same in the Y-axis direction of the opening 65. In the liquid discharging head 10 according to the modification 3, the width at each end portion of the opening 65 in the Y-axis direction is wider than the width of the central portion of the opening 65 in the Y-axis direction. In this manner, in the liquid discharging head 10 according to the modification 3, the width of the end portion of the opening 65 may be increased. For example, in the Y-axis direction, a width of the opening 65 of a region, in which the piezoelectric elements 50A and 50B are not disposed, can be increased. The region, in which the piezoelectric elements 50A and 50B are not disposed, may be, for example, a region where the lead electrode 54 is not disposed in the Y-axis direction. In this manner, by changing the width of the opening 65, the influence of stress due to adhesion of the pressure chamber substrate 25 and the sealing plate 27 can be mitigated. In the liquid discharging head 10 according to the modification 3, by mitigating the influence of stress due to adhesion of the pressure chamber substrate 25 and the sealing plate 27, an increase in the resonance frequency in the piezoelectric elements 50A and 50B disposed at end portions in the Y-axis direction can be reduced.

Next, the liquid discharging head 10 according to a modification 4 will be described. In the liquid discharging head 10 according to the modification 4, the wall surfaces 65*a* and 65*b* of the opening 65 formed in the sealing plate 27 are inclined. For example, in the first embodiment illustrated in FIG. 12, the wall surfaces 65*a* and 65*b* that define the opening 65 of the sealing plate 27 are formed and extends in the Z-axis direction. In the liquid discharging head 10 according to the modification 4, the wall surfaces 65*a* and 65*b* are inclined with respect to the central line O. In this manner, in the liquid discharging head 10 according to the modification 4, by forming the wall surfaces 65*a* and 65*b* as inclined surfaces, the adhesives 68A and 68B can easily flow in. Since the adhesive flows along the inclined surface, the adhesive can be disposed at an appropriate position.

Figure 32:
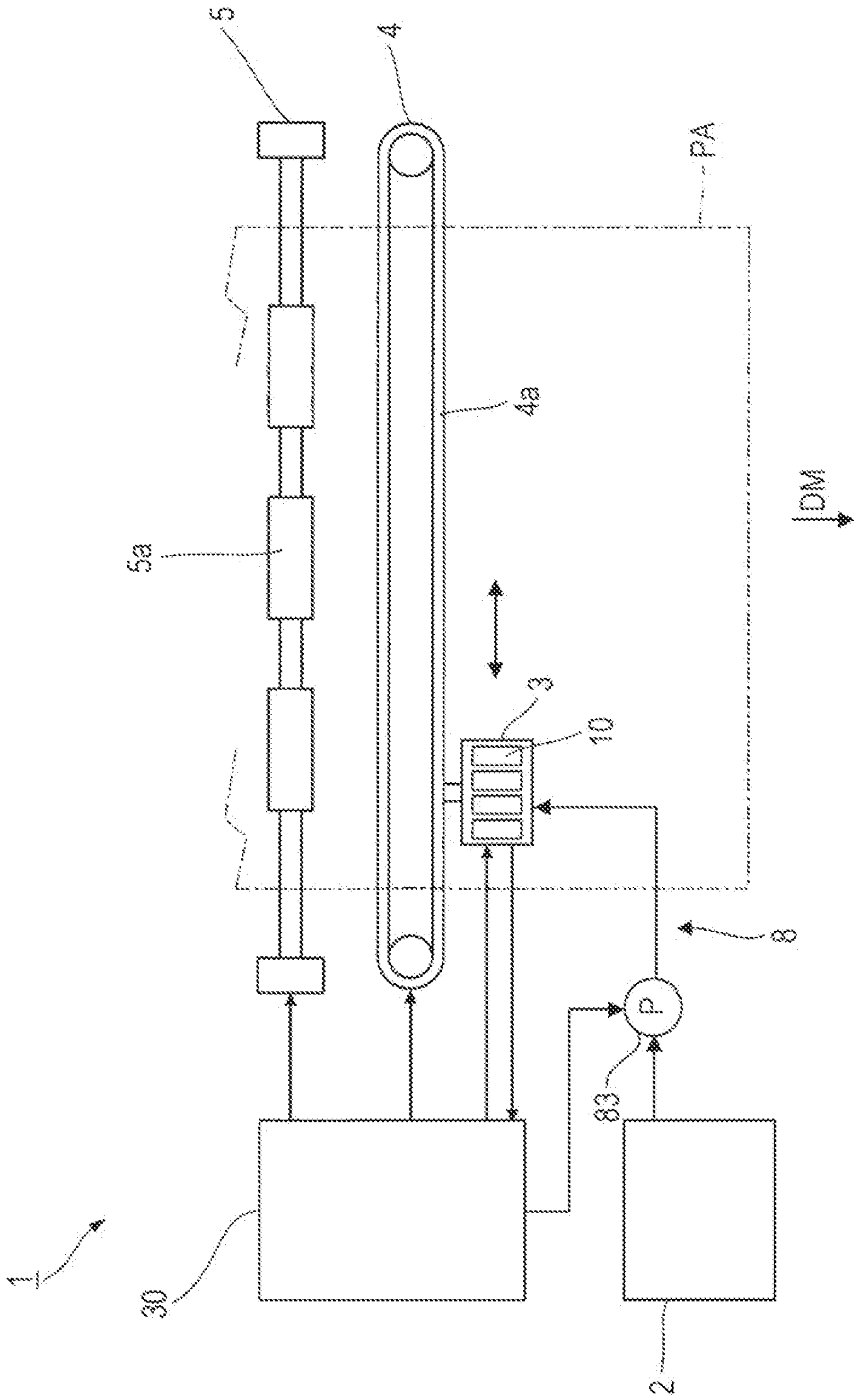
FIG. 32 is a schematic view of a liquid discharging apparatus including a liquid discharging head according to an embodiment.
Figure 33:
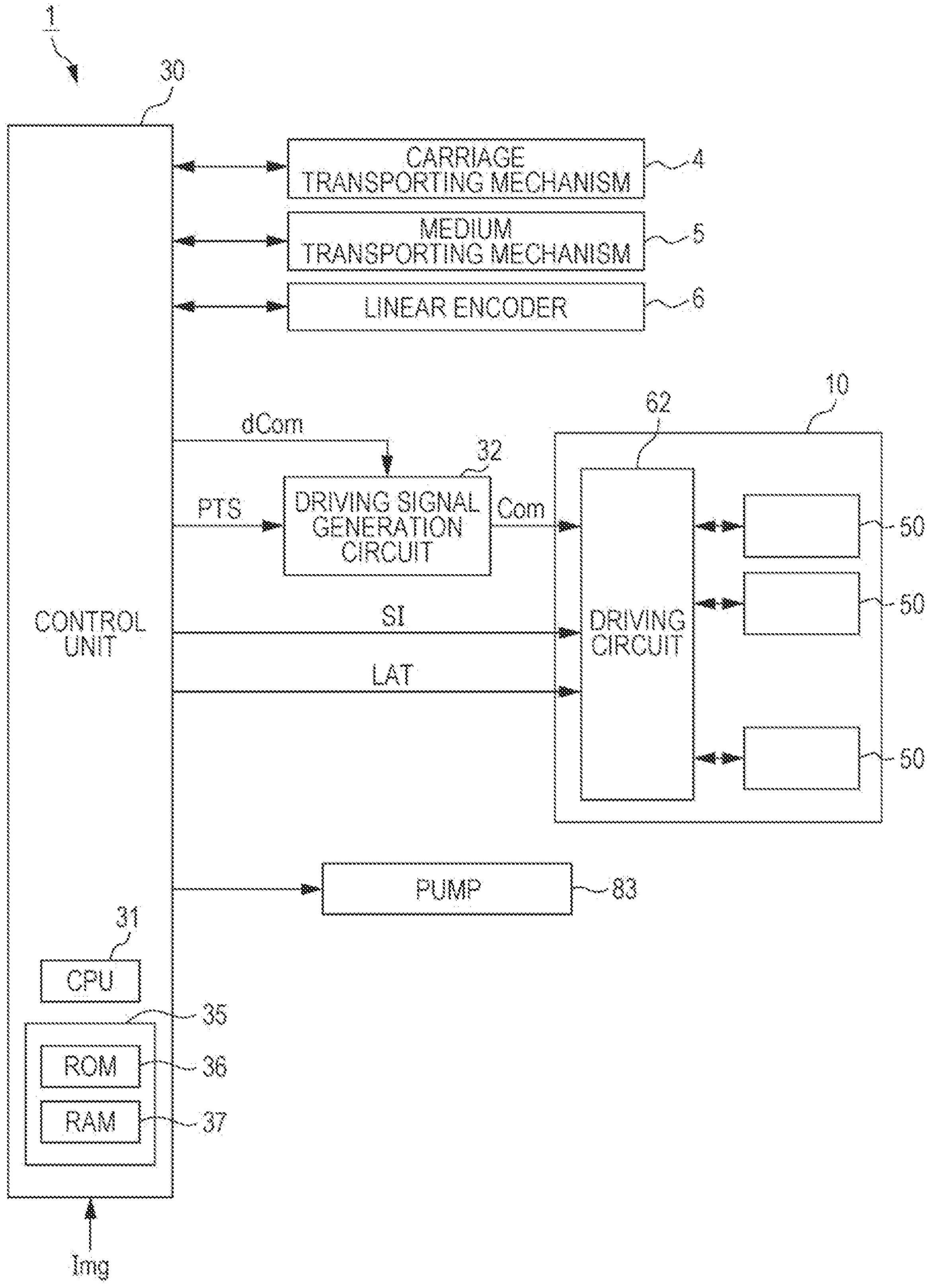
FIG. 33 is a block diagram illustrating the liquid discharging apparatus.

Next, with reference to FIGS. 32 and 33, the liquid discharging apparatus 1 including the liquid discharging head 10 will be described. FIG. 32 is a schematic view of the liquid discharging apparatus 1 including the liquid discharging head 10. The liquid discharging apparatus 1 includes the above-described liquid discharging head 10. FIG. 33 is a block diagram illustrating the liquid discharging apparatus 1. The liquid discharging apparatus 1 is an ink jet printer that discharges ink, which is one example of the liquid, as a droplet to a medium PA. The liquid discharging apparatus 1 is a serial type printer. The medium PA is typically printing paper. Note that the medium PA is not limited to printing paper, and may be, for example, an object to be printed made of an appropriate material such as a resin film or fabric.

The liquid discharging apparatus 1 includes the liquid discharging head 10 that discharges ink, a liquid container 2 that stores ink, a carriage 3 on which the liquid discharging head 10 is mounted, a carriage transporting mechanism 4 that transports the carriage 3, a medium transporting mechanism 5 that transports the medium PA, and the control unit 30. The control unit 30 is a control unit that controls discharge of ink.

As a specific aspect of the liquid container 2, for example, a cartridge that is detachable from the liquid discharging apparatus 1, a bag-like ink pack formed of a flexible film, and an ink tank that can be refilled with ink are exemplified. The kind of ink stored in the liquid container 2 is optional. The liquid discharging apparatus 1 includes, for example, a plurality of the liquid containers 2 corresponding to four colors of ink. The four colors of ink are, for example, cyan, magenta, yellow, and black. The liquid containers 2 may be mounted on the carriage 3.

The liquid discharging apparatus 1 has a liquid supply passage 8 that supplies ink of each liquid container 2 to the liquid discharging head 10. In the liquid supply passage 8, a pump 83 that transports ink is provided.

The carriage transporting mechanism 4 has a transporting belt 4*a* for transporting the carriage 3 and a motor. The medium transporting mechanism 5 has a transporting roller 5*a* for transporting the medium PA and a motor. The carriage transporting mechanism 4 and the medium transporting mechanism 5 are controlled by the control unit 30. The liquid discharging apparatus 1 transports the carriage 3 by the carriage transporting mechanism 4 while transporting the medium PA by the medium transporting mechanism 5, to discharge an ink droplet to the medium PA to perform printing.

As illustrated in FIG. 33, the liquid discharging apparatus 1 includes a linear encoder 6. The linear encoder 6 is provided at a position where the position of the carriage 3 is detectable. The linear encoder 6 acquires information on the position of the carriage 3. The linear encoder 6 outputs an encoder signal to the control unit 30 according to the movement of the carriage 3.

The control unit 30 includes one or a plurality of central processing units (CPUs) 31. The control unit 30 may include a field-programmable gate array (FPGA) instead of the CPUs 31 or in addition to the CPUs 31. The control unit 30 includes a storage unit 35. The storage unit 35 includes, for example, a read only memory (ROM) 36 and a random access memory (RAM) 37. The storage unit 35 may include an electrically erasable programmable read-only memory (EEPROM) or a programmable ROM (PROM). The storage unit 35 can store printing data Img supplied from a host computer. The storage unit 35 stores a control program of the liquid discharging apparatus 1.

CPU is an abbreviation of central processing unit. FPGA is an abbreviation of field-programmable gate array. RAM is an abbreviation of random access memory. ROM is an abbreviation of read only memory. EEPROM is an abbreviation of electrically erasable programmable read-only memory. PROM is an abbreviation of programmable ROM.

The control unit 30 generates a signal for controlling operation of each unit of the liquid discharging apparatus 1. The control unit 30 can generate a printing signal SI and a waveform specification signal dCom. The printing signal SI is a digital signal for specifying the kind of operation of the liquid discharging head 10. The printing signal SI can specify whether or not to supply the driving signal Com to the piezoelectric element 50. The waveform specification signal dCom is a digital signal for regulating a waveform of the driving signal Com. The driving signal Com is an analogue signal for driving the piezoelectric element 50.

The liquid discharging apparatus 1 includes the driving signal generation circuit 32. The driving signal generation circuit 32 is electrically coupled to the control unit 30. The driving signal generation circuit 32 includes a DA conversion circuit. The driving signal generation circuit 32 generates the driving signal Com having a waveform regulated by the waveform specification signal dCom. Upon receiving an encoder signal from the linear encoder 6, the control unit 30 outputs a timing signal PTS to the driving signal generation circuit 32. The timing signal PTS regulates the generation timing of the driving signal Com. The driving signal generation circuit 32 outputs the driving signal Com every time the timing signal PTS is received.

The driving circuit 62 is electrically coupled to the control unit 30 and the driving signal generation circuit 32. The driving circuit 62 is, based on the printing signal SI, switches whether or not to supply the driving signal Com to the piezoelectric element 50. The driving circuit 62 can select the piezoelectric element 50 to which the driving signal Com is supplied, based on the printing signal SI, a latch signal LAT, and a change signal CH that are supplied from the control unit 30. The latch signal LAT regulates the latch timing of the printing data Img. The change signal CH regulates the selecting timing of a driving pulse included in the driving signal Com.

The control unit 30 controls an ink discharge operation by the liquid discharging head 10. As described above, by driving the piezoelectric element 50, the control unit 30 changes the pressure of ink in the pressure chamber C so as to discharge the ink from the nozzle N. The control unit 30 controls the discharge operation when a printing operation is performed.

In the liquid discharging apparatus 1 described above, the above-described liquid discharging head 10 can be adopted. In the liquid discharging head 10, as described above, variation between the discharging characteristics by the piezoelectric element 50A on the line A side and the discharging characteristics by the piezoelectric element 50B on the line B side can be suppressed. Note that in the liquid discharging apparatus 1, the liquid discharging heads 10B to 10G may be adopted.

Note that the previously described embodiments are merely representative forms of the present disclosure, and the present disclosure is not limited to the previously described embodiments, and various modifications and additions can be made without departing from the gist of the present disclosure.

In the previously described embodiments, the serial type liquid discharging apparatus 1 that causes the carriage 3, on which the liquid discharging head 10 is mounted, to reciprocate in the width direction of the medium PA is exemplified. However, a line type liquid discharging apparatus including a line head, in which the liquid discharging head 10 is disposed and arranged in a predetermined direction, may be applied to the present disclosure.

The liquid discharging apparatus 1 exemplified by the previously described embodiments can be adopted in a dedicated device for printing, and various types of devices such as a facsimile device and a copying machine. However, the purpose of the liquid discharging apparatus of the present disclosure is not limited to printing. For example, a liquid discharging apparatus that discharges a solution of a coloring material can be used as a manufacturing apparatus for forming a color filter of a display device such as a liquid crystal display panel. In addition, a liquid discharging apparatus that discharges a solution of a conductive material can be used as a manufacturing apparatus for forming wiring or an electrode of a wiring substrate. In addition, a liquid discharging apparatus that discharges a solution of an organic substance relating to a living organism can be used, for example, as a manufacturing apparatus for manufacturing a biochip.

What is claimed is:

1. A liquid discharging head comprising:

a pressure chamber substrate on which a plurality of first pressure chambers and a plurality of second pressure chambers are formed;

a first piezoelectric element line in which a plurality of piezoelectric elements is arranged, each of the plurality of piezoelectric elements being provided for each of the plurality of first pressure chambers;

a second piezoelectric element line in which a plurality of piezoelectric elements is arranged, each of the plurality of piezoelectric elements being provided for each of the plurality of second pressure chambers;

a wiring substrate that is disposed between the first piezoelectric element line and the second piezoelectric element line and supplies a voltage to the plurality of piezoelectric elements in the first piezoelectric element line and the plurality of piezoelectric elements in the second piezoelectric element line; and a vibration plate that is disposed, in a thickness direction of the pressure chamber substrate, between the pressure chamber substrate and the plurality of piezoelectric elements, wherein an adhesive having a first amount exists on a side of the first piezoelectric element line, of a joint of the wiring substrate and the pressure chamber substrate or the vibration plate, an adhesive having a second amount that is larger than the first amount exists on a side of the second piezoelectric element line of the wiring substrate, of the joint, and a first discharging element related to the first piezoelectric element line is different from a second discharging element related to the second piezoelectric element line.

2. The liquid discharging head according to claim 1, wherein directions that mutually intersect are a first direction and a second direction, in each of the first piezoelectric element line and the second piezoelectric element line, the plurality of piezoelectric elements is arranged in the first direction, and the first piezoelectric element line and the second piezoelectric element line are mutually separated in the second direction.

3. The liquid discharging head according to claim 2, wherein the first discharging element includes a length of the first pressure chamber in the first direction, the second discharging element includes a length of the second pressure chamber in the first direction, and the length of the second pressure chamber in the first direction is longer than the length of the first pressure chamber in the first direction.

4. The liquid discharging head according to claim 2, wherein the plurality of piezoelectric elements has an individual electrode that is provided individually for the plurality of piezoelectric elements, a common electrode provided in common for the plurality of piezoelectric elements, and a piezoelectric laminate that is disposed between the individual electrode and the common electrode, the first discharging element includes a length of the individual electrode, in the first direction, of each of the piezoelectric elements in the first piezoelectric element line, the second discharging element includes a length of the individual electrode, in the first direction, of the piezoelectric element in the second piezoelectric element line, and the length of the individual electrode, in the first direction, of the piezoelectric element in the second piezoelectric element line is longer than the length of the individual electrode, in the first direction, of the piezoelectric element in the first piezoelectric element line.

5. The liquid discharging head according to claim 2, wherein the plurality of piezoelectric elements has an individual electrode that is provided individually for the plurality of piezoelectric elements, a common electrode provided in common for the plurality of piezoelectric elements, and a piezoelectric laminate that is disposed between the individual electrode and the common electrode, the first discharging element includes a length of the piezoelectric laminate, in the first direction, of each of the piezoelectric elements in the first piezoelectric element line, the second discharging element includes a length of the piezoelectric laminate, in the first direction, of the piezoelectric element in the second piezoelectric element line, and the length of the piezoelectric laminate, in the first direction, of the piezoelectric element in the second piezoelectric element line is shorter than the length of the piezoelectric laminate, in the first direction, of the piezoelectric element in the first piezoelectric element line.

6. The liquid discharging head according to claim 2, wherein the first discharging element includes a length of the first pressure chamber in the second direction, the second discharging element includes a length of the second pressure chamber in the second direction, and the length of the second pressure chamber in the second direction is longer than the length of the first pressure chamber in the second direction.

7. The liquid discharging head according to claim 2, further comprising:

a first passage that is configured to make a liquid flow from an outside upstream of the first pressure chamber to a first nozzle that discharges the liquid, through the first pressure chamber; and a second passage that is configured to make a liquid flow from an outside upstream of the second pressure chamber to a second nozzle that discharges the liquid, through the second pressure chamber, wherein the first discharging element includes a minimum cross sectional area when viewed in a flowing direction of the liquid in the first passage, the second discharging element includes a minimum cross sectional area when viewed in a flowing direction of the liquid in the second passage, and the minimum cross sectional area of the second passage when viewed in the flowing direction of the liquid in the second passage is larger than the minimum cross sectional area of the first passage when viewed in the flowing direction of the liquid in the first passage.

8. The liquid discharging head according to claim 2, further comprising:

a first nozzle that communicates with the first pressure chamber and discharges a liquid; and a second nozzle that communicates with the second pressure chamber and discharges a liquid, wherein the first discharging element includes a diameter of the first nozzle, the second discharging element includes a diameter of the second nozzle, and the diameter of the second nozzle is larger than the diameter of the first nozzle.

9. The liquid discharging head according to claim 1, further comprising:

a nozzle that communicates with both of the first pressure chamber and the second pressure chamber in common and discharges a liquid.

10. The liquid discharging head according to claim 1, wherein the wiring substrate includes a main body portion that extends in the thickness direction of the pressure chamber substrate, and a terminal that is bent toward a side of the second piezoelectric element line from an end portion of the main body portion on a side of the pressure chamber substrate.

11. A liquid discharging apparatus comprising:

the liquid discharging head according to claim 1; and a control unit that controls discharge of a liquid by the liquid discharging head.

12. A liquid discharging head comprising:

a pressure chamber substrate on which a plurality of first pressure chambers and a plurality of second pressure chambers are formed;

a first piezoelectric element line in which a plurality of piezoelectric elements is arranged, each of the plurality of piezoelectric elements being provided for each of the plurality of first pressure chambers;

a second piezoelectric element line in which a plurality of piezoelectric elements is arranged, each of the plurality of piezoelectric elements being provided for each of the plurality of second pressure chambers;

a wiring substrate that is disposed between the first piezoelectric element line and the second piezoelectric element line and supplies a voltage to the plurality of piezoelectric elements in the first piezoelectric element line and the plurality of piezoelectric elements in the second piezoelectric element line; and a vibration plate that is disposed, in a thickness direction of the pressure chamber substrate, between the pressure chamber substrate and the plurality of piezoelectric elements, wherein the wiring substrate includes a main body portion that extends in the thickness direction of the pressure chamber substrate, and a terminal that is bent toward a side of the second piezoelectric element line from an end portion of the main body portion on a side of the pressure chamber substrate, an adhesive having a first amount exists on a side of the first piezoelectric element line, of a joint of the wiring substrate and the pressure chamber substrate or the vibration plate, and an adhesive having a second amount exists on a side of the second piezoelectric element line of the wiring substrate, of the joint.

* * * * *